(12) United States Patent
Phelps et al.

(10) Patent No.: US 8,315,363 B2
(45) Date of Patent: Nov. 20, 2012

(54) NETWORK CALL RECORDING

(75) Inventors: David Phelps, Colorado Springs, CO (US); Brian Badger, Divide, CO (US); Robert Sartini, Colorado Springs, CO (US); John Macedo, Clearwater, FL (US); Gregory J. Bjornberg, Colorado Springs, CO (US); John Rivera, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1139 days.

(21) Appl. No.: 12/188,562

(22) Filed: Aug. 8, 2008

(65) Prior Publication Data
US 2010/0034362 A1 Feb. 11, 2010

(51) Int. Cl.
H04M 1/64 (2006.01)
H04Q 3/62 (2006.01)
H04L 12/66 (2006.01)

(52) U.S. Cl. ............ 379/88.19; 370/352; 370/356; 379/9; 379/32.05; 379/142.04; 379/266.1; 379/355.1; 705/35; 709/220

(58) Field of Classification Search ......... 379/32.05, 379/88.19, 142.04, 266.1, 219, 265.06, 386, 379/9, 266.07, 355.1; 709/220; 370/356, 352; 705/35
See application file for complete search history.

(56) References Cited

U.S. PATENT DOCUMENTS

| | | | | |
|---|---|---|---|---|
| 5,265,157 A * | 11/1993 | Jolissaint et al. | ............ | 379/386 |
| 5,343,518 A * | 8/1994 | Kneipp | ............ | 379/355.1 |
| 5,546,452 A * | 8/1996 | Andrews et al. | ............ | 379/219 |
| 5,974,114 A * | 10/1999 | Blum et al. | ............ | 379/9 |
| 6,345,094 B1 * | 2/2002 | Khan et al. | ............ | 379/266.07 |
| 6,996,094 B2 * | 2/2006 | Cave et al. | ............ | 370/356 |
| 7,035,252 B2 * | 4/2006 | Cave et al. | ............ | 370/356 |
| 7,068,642 B1 * | 6/2006 | Khan | ............ | 370/352 |
| 7,706,520 B1 * | 4/2010 | Waterson et al. | ............ | 379/265.06 |
| 7,801,281 B2 * | 9/2010 | Van Natter et al. | ............ | 379/32.05 |
| 7,899,180 B2 * | 3/2011 | Blair | ............ | 379/266.1 |
| 7,949,112 B2 * | 5/2011 | Miller et al. | ............ | 379/142.04 |
| 2008/0155067 A1 * | 6/2008 | Rivera | ............ | 709/220 |
| 2008/0301021 A1 * | 12/2008 | Kwong Hin Sang | ............ | 705/35 |
| 2010/0034362 A1 * | 2/2010 | Phelps et al. | ............ | 379/88.19 |

* cited by examiner

*Primary Examiner* — Gerald Gauthier

(57) ABSTRACT

A method and system of an embodiment may include receiving at least a portion of a call recording request at a voice response unit, identifying a call received at the voice response unit as a call matching one or more parameters of the call recording request, and utilizing available digital signal processing resources of the voice response unit to record one or more specified portions of the call.

22 Claims, 16 Drawing Sheets

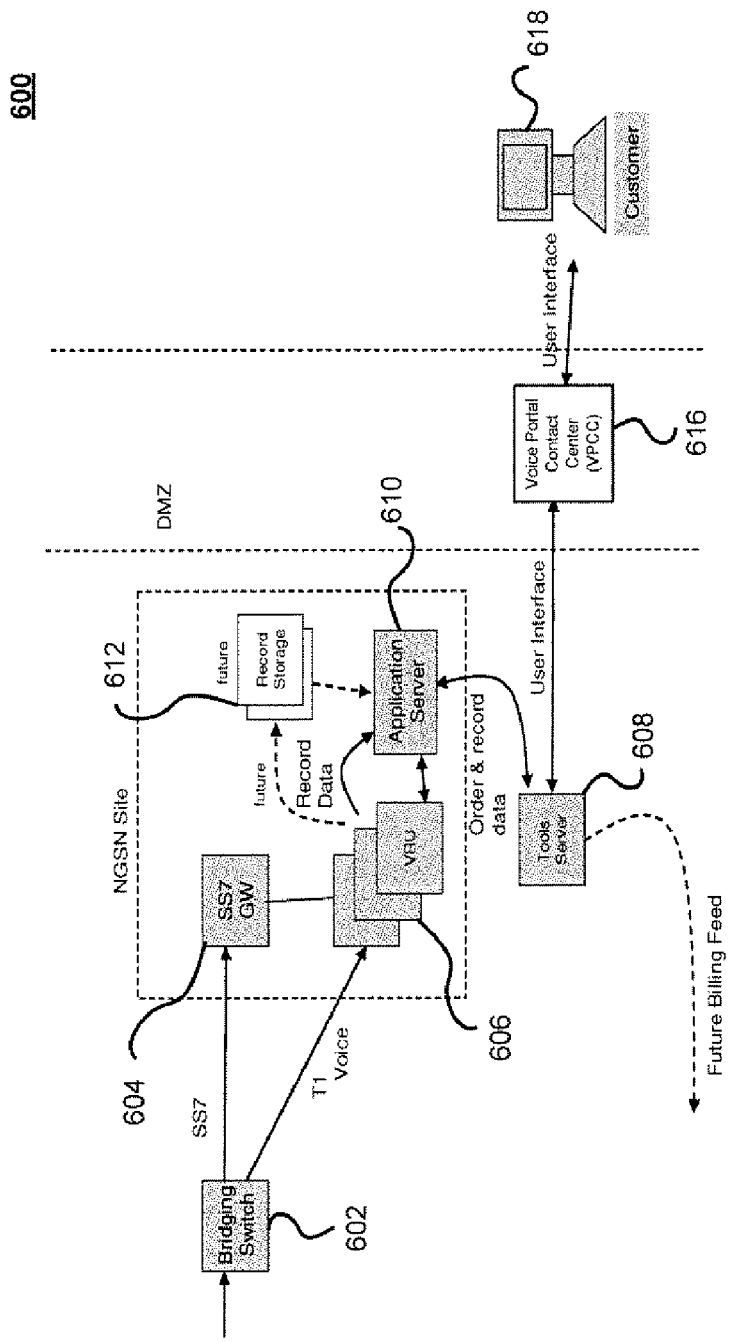
Figure 6 TDM Recording System Context

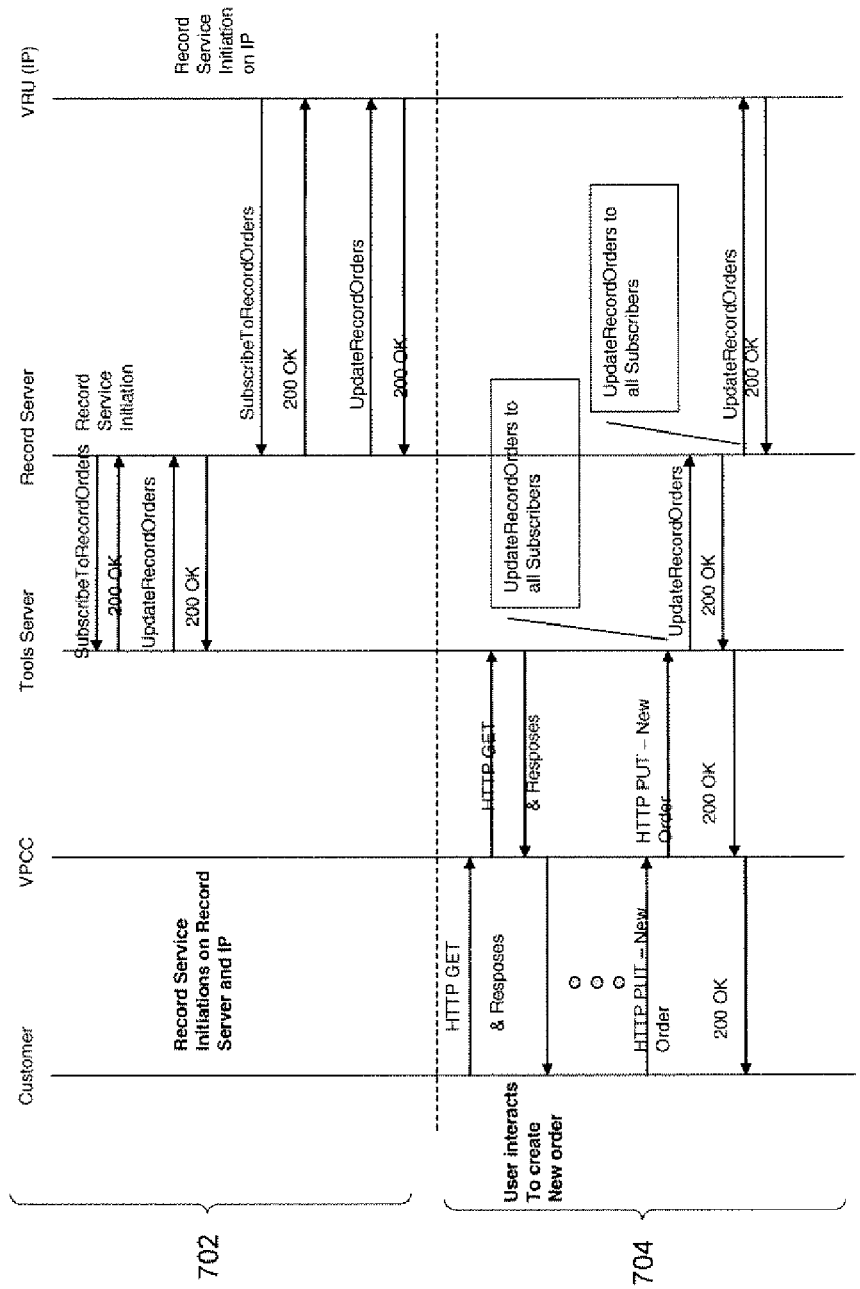
Figure 7 Record Request Subscription and new Record Request

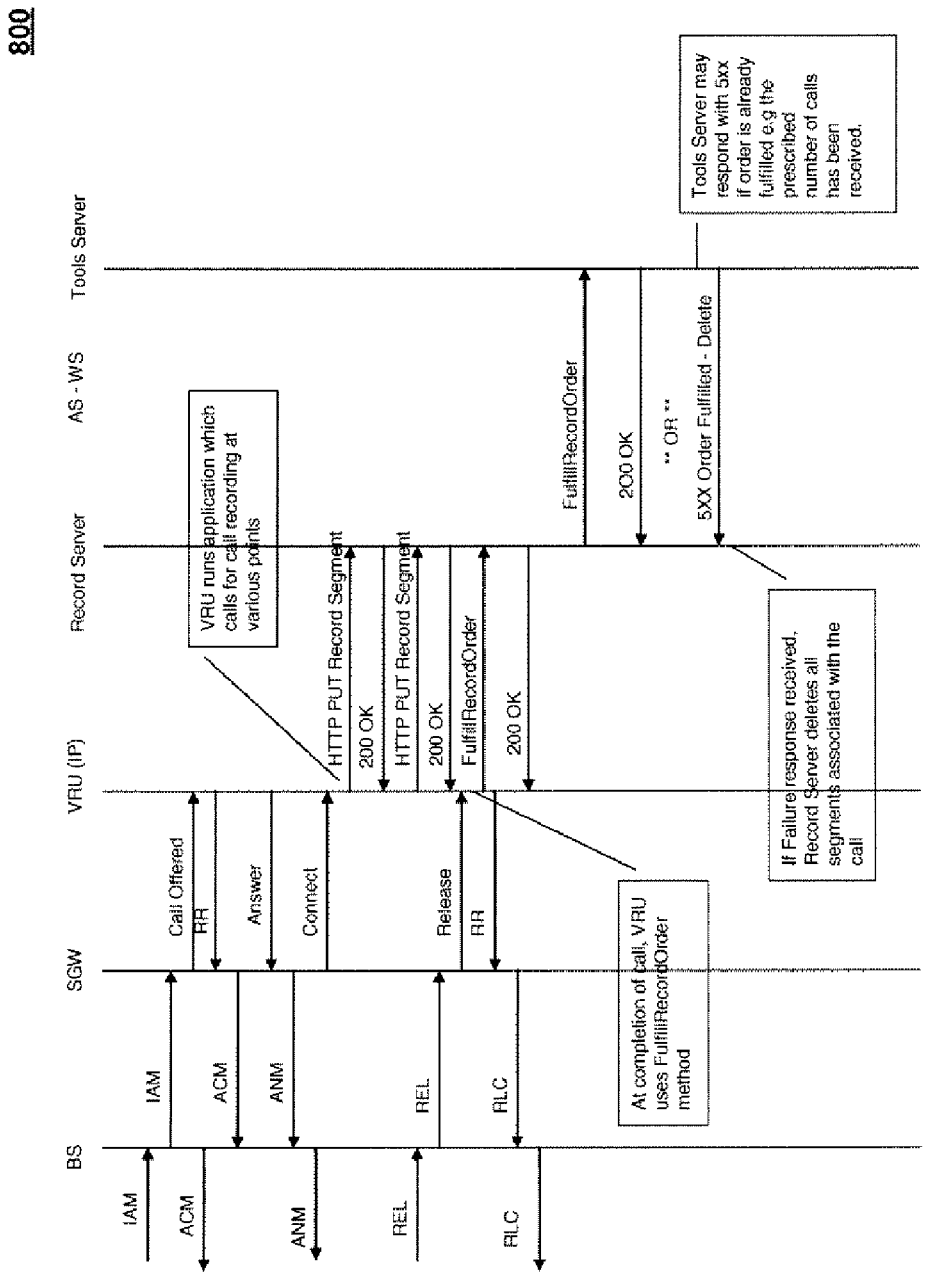
Figure 8 Audio Capture

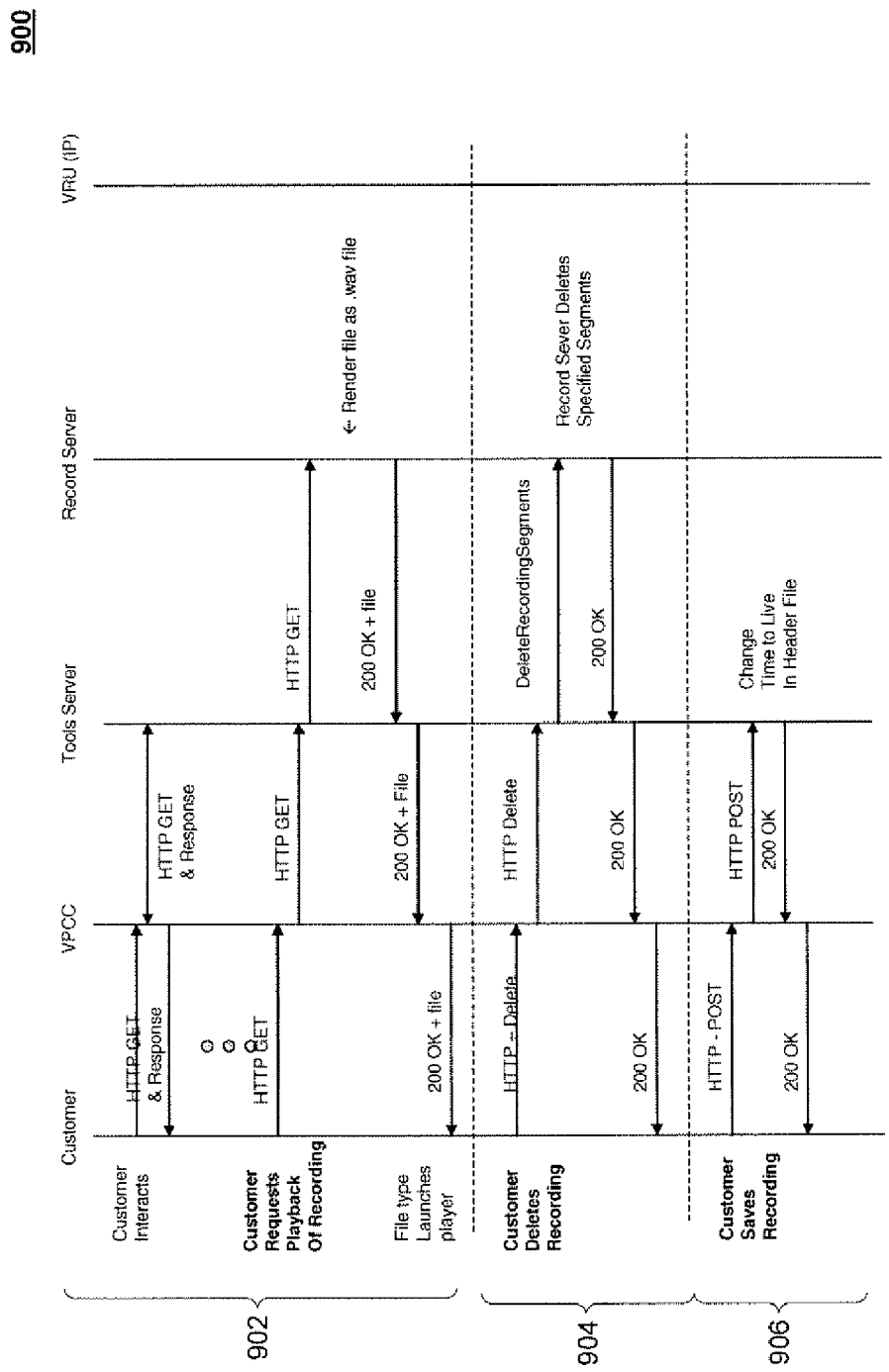
Figure 9 Recording Playback, Deletion, and Save

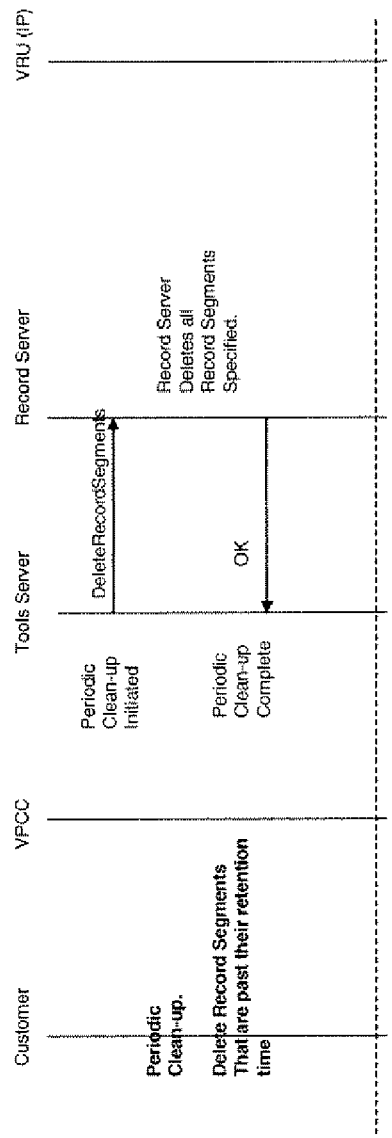
Figure 10 Period Clean-up

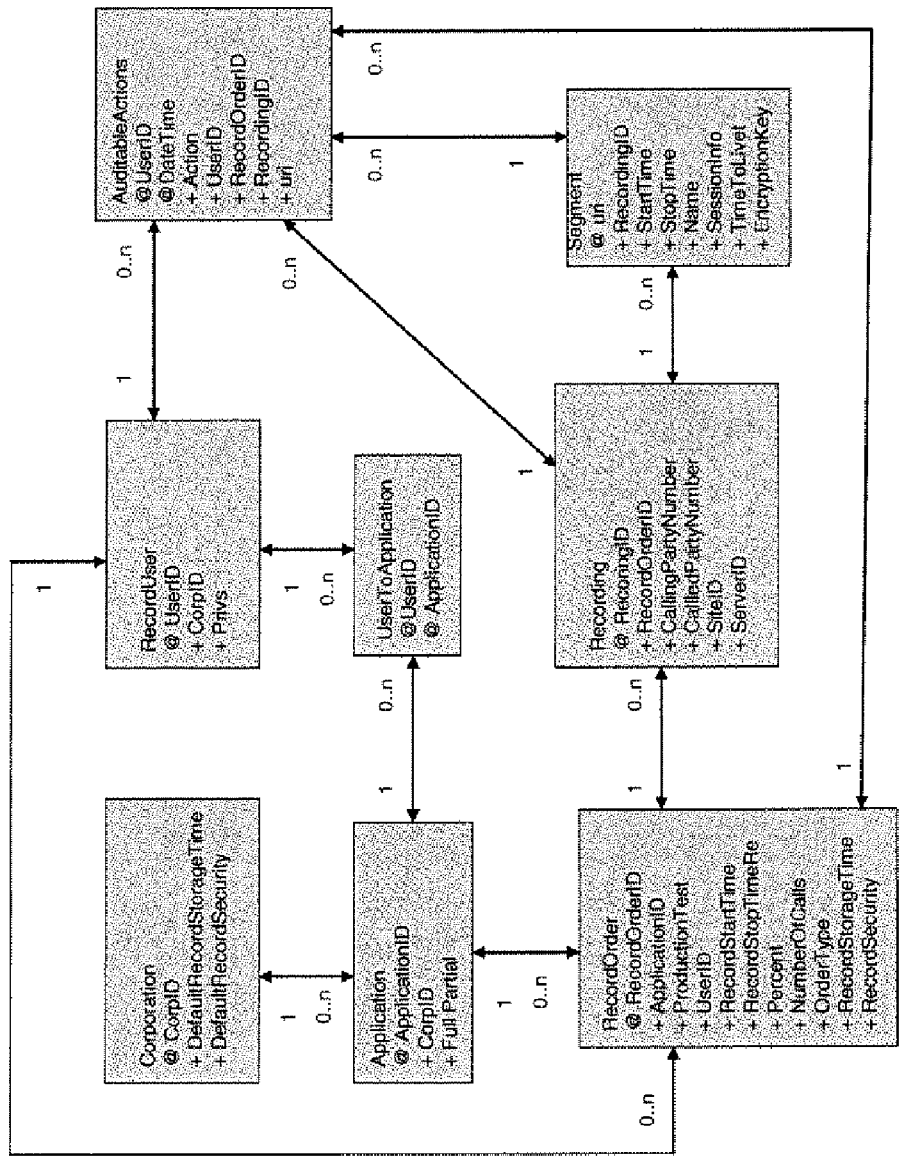
Figure 11a Entity Relationships

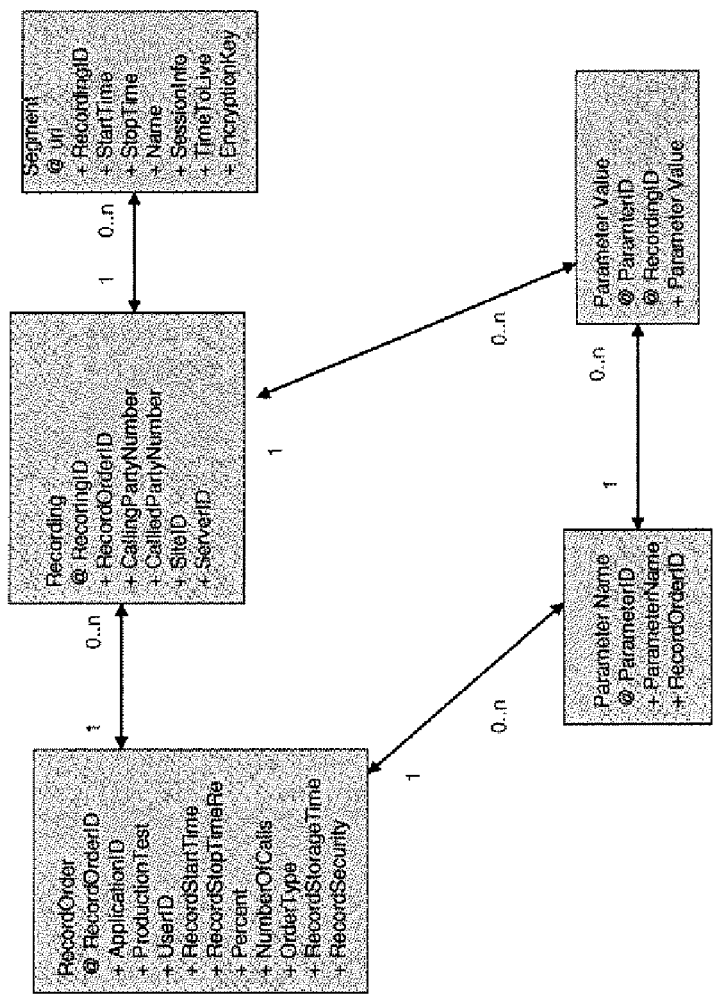
Figure 11b Entity Relationships

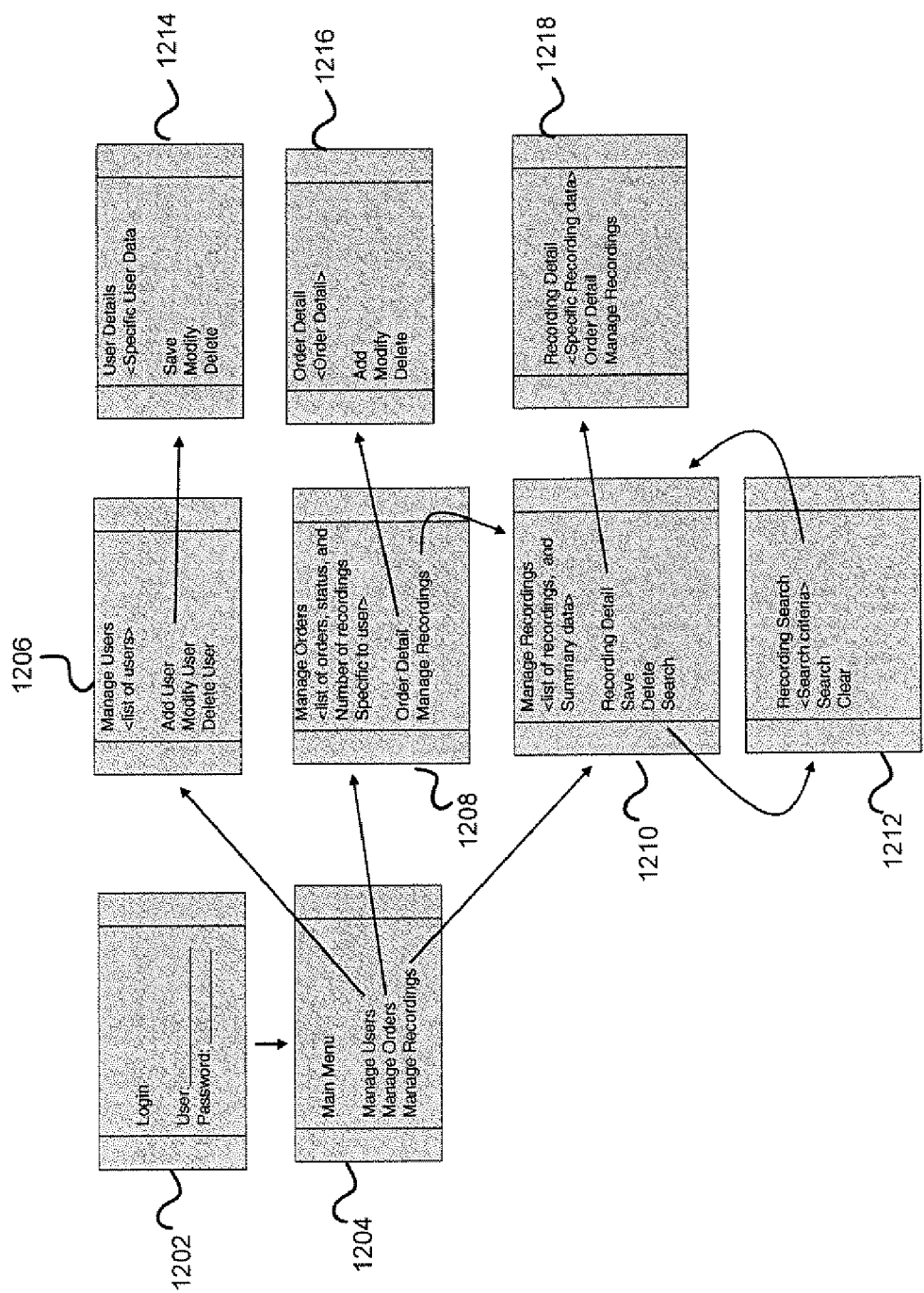
Figure 12 Summary of Exemplary Call Recording Management Screens

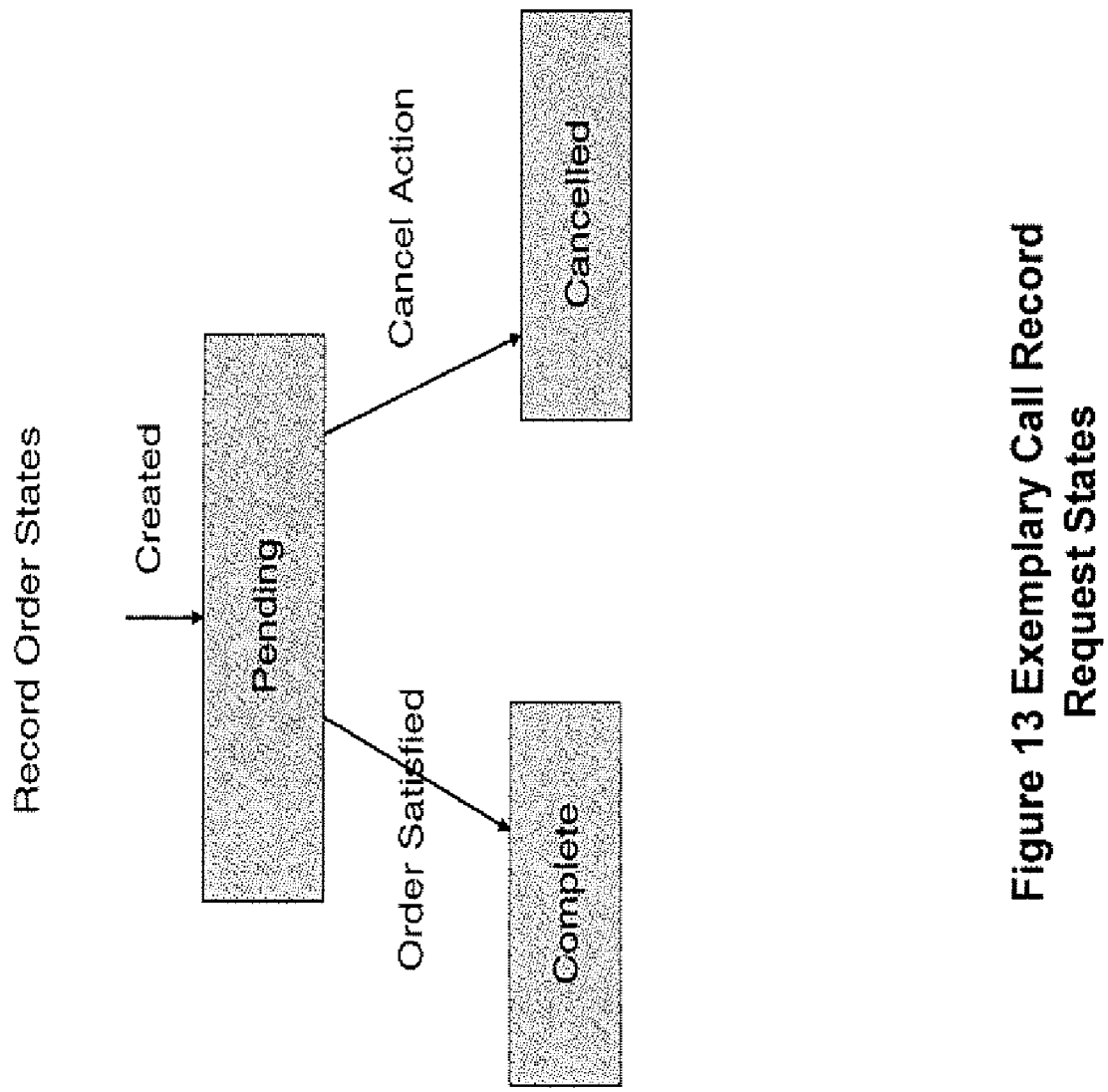
Figure 13 Exemplary Call Record Request States

```
Audio Capture Minutes Report    Date         Minutes
--------------------------------------------------------
CorpID + ApplicationID                       nnnnnnn
CorpID + ApplicationID                       nnnnnnn
Etc.
Total Storage Minutes                        nnnnnnn
```

Figure 14 Audio Capture Minutes Report

```
Audio Capture Storage Report    Date    Long Term    Short Term
                                        (minutes)    (minutes)
CorpID + ApplicationID                  nnnnnn       nnnnnn
CorpID + ApplicationID                  nnnnnn       nnnnnn
Etc.
Total                                   nnnnnn       nnnnnn
```

Figure 15 Audio Capture Storage Report

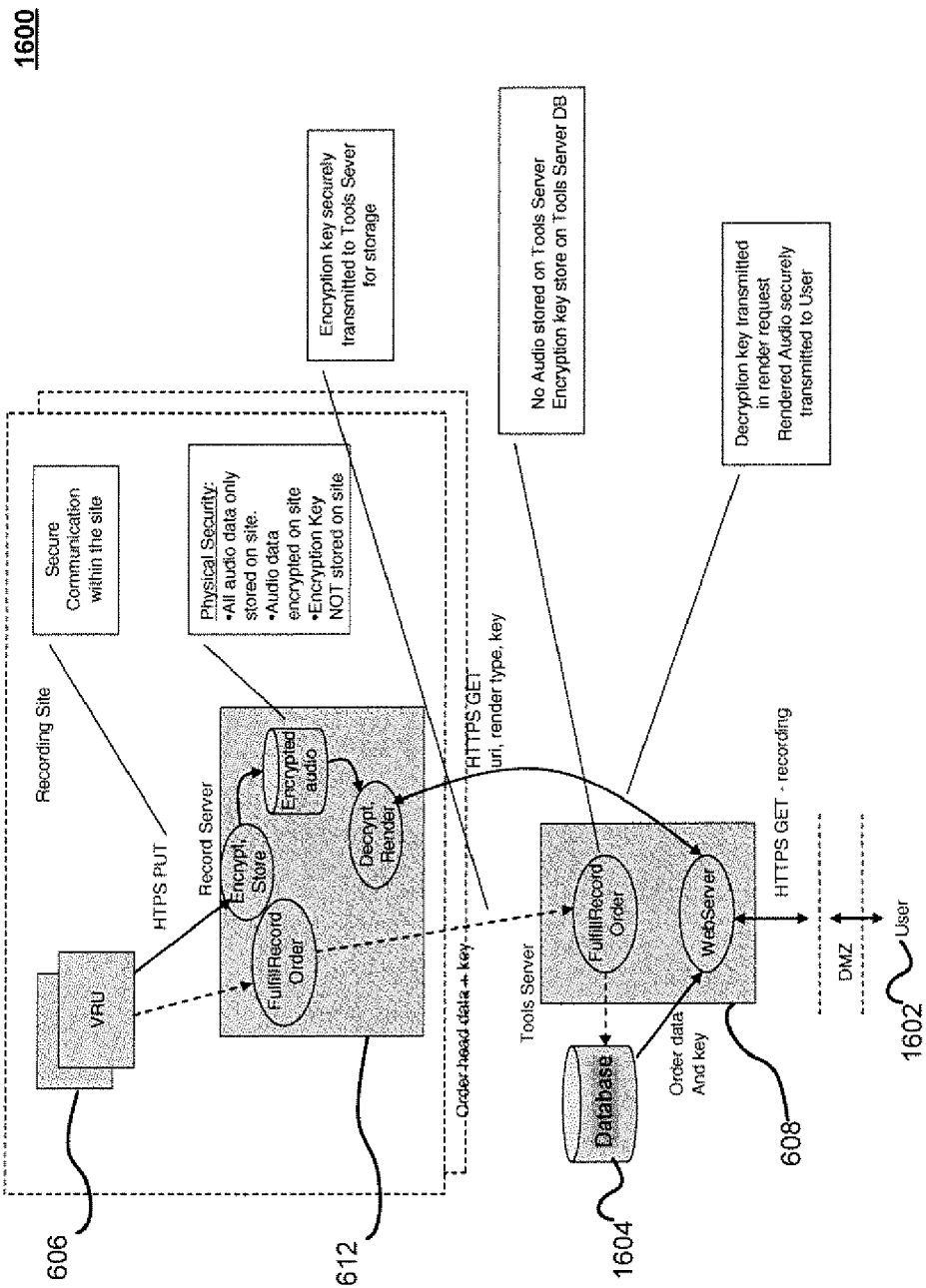
Figure 16 Recording Security Architecture

NETWORK CALL RECORDING

BACKGROUND INFORMATION

Phone call recording may be desired by one or more users of a service provider. Call recording may enable a transcription for legal purposes, marketing purposes, business purposes training purposes and/or for other uses. Call recording at a user location may not capture the full call. For example, call recording implemented on a PBX (private branch exchange) may not capture a portion of a call prior to a transfer to the PBX or after a transfer from a PBX. Recording a call at a network location may require significant resources for processing and storage. Recording a call at a network location may require a service provider to deploy a new platform to handle call recording. The deployment of a new platform to handle call recording may require extensive resources and may take a significant portion of time.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

FIG. 6 depicts a block diagram of a system architecture for network call recording, in accordance with an exemplary embodiment;

FIG. 7 depicts communication between a network call recording system and a user, in accordance with an exemplary embodiment;

FIG. 8 depicts communication between components of a network call recording system, in accordance with an exemplary embodiment;

FIG. 9 depicts communication between a network call recording system and a user, in accordance with an exemplary embodiment;

FIG. 10 depicts communication between components of a network call recording system, in accordance with an exemplary embodiment;

FIG. 11a depicts an entity relationship diagram illustrating a first set of entities utilized for network call recording, in accordance with an exemplary embodiment;

FIG. 11b depicts an entity relationship diagram illustrating a second set of entities utilized for network call recording, in accordance with an exemplary embodiment;

FIG. 12 is flowchart depicting relationships between call recording management screens, in accordance with an exemplary embodiment;

FIG. 13 is a flowchart depicting different call recording request states, in accordance with an exemplary embodiment;

FIG. 14 depicts a call recording report, in accordance with an exemplary embodiment;

FIG. 15 depicts a call recording report, in accordance with an exemplary embodiment; and FIG. 16 depicts a block diagram of a system architecture for network call recording, in accordance with an exemplary embodiment.

DETAILED DESCRIPTION OF PREFERRED EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Figure 1:
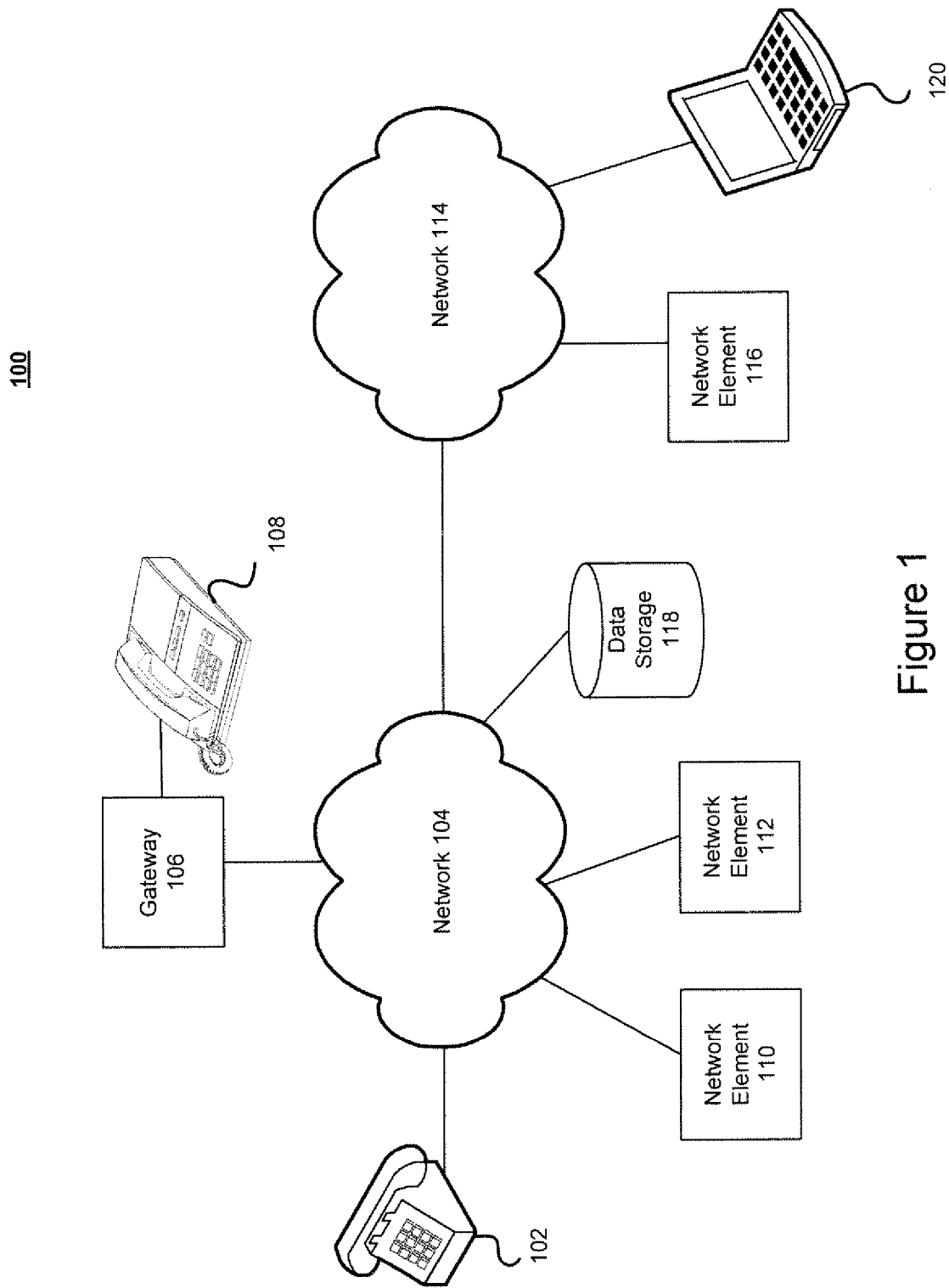
FIG. 1 depicts a block diagram of a system architecture for network call recording, in accordance with an exemplary embodiment.

FIG. 1 depicts a block diagram of a system 100 for network call recording, in accordance with an exemplary embodiment. It is noted that System 100 is a simplified view of a network and may include additional elements that are not depicted. As illustrated, network 104 and/or 114 may contain one or more network elements 110, 112, and 116. Telecommunication devices 102 and 108 may be communicatively coupled to network 104 and/or network 114. Telecommunication client 108 may connect to network 104 via gateway 106. Data storage 118 may be communicatively coupled to network 104 and/or network 114. Network client 120 may be communicatively coupled to network 114.

Gateway 106 may be a PBX (private branch exchange), a residential gateway or another interface providing connectivity between telecommunications device 108 and network 104.

Telecommunication devices 102 and 108 may be wireline phones, cellular phones, mobile phones, or satellite phones, Session Initiation Protocol (SIP) based phones, Personal Digital Assistants (PDA), computers, or other devices capable of sending and/or receiving a telephone call. Telecommunication devices 102 and 108 may be operatively connected to network 104 and/or network 114.

Telecommunication devices 102 and 108 may transmit and/or receive data to and/or from network 104 and network 114 representing call data. The call data may be transmitted and/or received utilizing a standard telecommunications protocol or a standard networking protocol. For example, one embodiment may utilize Session Initiation Protocol (SIP). In other embodiments, the call data may be transmitted and/or received utilizing other Voice Over IP (VOIP) protocols. Call data may be transmitted and/or received wirelessly or may utilize cabled network or telecom connections such as an Ethernet RJ45/Category 5 Ethernet connection, a fiber connection, a traditional phone wireline connection, a cable connection or other wired network connection. Telecommunication devices 102 and 108 may use standard wireless protocols including IEEE 802.11a, 802.11b and 802.11g. Telecommunication devices 102 and 108 may also be connected to networks 104 and/or 114 via protocols for a wired connection, such as an IEEE Ethernet 802.3.

Networks 104 and/or 114 may be local area networks (LANs), wide area networks (WANs), the Internet, cellular networks, satellite networks, long distance telecommunication networks, or other networks that permit the transfer and/or reception of data to and/or from telecommunication devices 102 and 108. Network 104 and/or network 114 may utilize one or more protocols of telecommunication devices 102 and 108. Network 104 and/or network 114 may translate to or from other protocols to one or more protocols of telecommunication devices 102 and 108. Network 104 and/or network 114 may be IP (Internet Protocol) based networks, networks utilizing time domain multiplexing (TDM), networks utilizing signaling system #7 (SS7) and/or networks utilizing other telecommunication or data protocols. Network 104 and/or network 114 may contain one or more network elements.

Network elements 110, 112, and 116 may be Session Initiation Protocol (SIP) servers, application servers, user acceptance testing (UAT) application servers, record servers, voice response units (VRUs), bridging switches, gateways, tools servers, voice portals, network interactive voice response (IVR) nodes or other network devices. In some embodiments, VRUs, SS7 gateways, and application servers may be a part of a NGSN. Network elements 110, 112, and 116 may include one or more processors (not shown) for recording, transmitting, receiving, and or storing data. Although network elements 110, 112, and 116 are each depicted as one server, it should be appreciated that the contents of a network element may be combined into a fewer or greater number of devices and may be connected to one or more data storage systems. For example, network element 112 may be connected to one or more record servers. Furthermore, the record servers may be local, remote, or a combination thereof to network element 112.

Network elements 110, 112, and 116 may provide application programming interfaces (APIs), interface tables, remote procedure calls (rpcs), web services, Extensible Markup Language (XML) based interfaces, Simple Object Access Protocol (SOAP) based interfaces, common request broker architecture (CORBA), interfaces utilizing Hypertext Transfer Protocol (HTTP) Common Gateway Interfaces (CGI), and other interfaces for sending or receiving call recording information.

Network client 120 may be a portable computer, according to one embodiment. Network client 120 may also be another device capable of sending and receiving network signals such as a personal digital assistant, desktop computer, workstation, server, and/or a cellular telephone. Network client 120 may authenticate with a network using Wired Equivalent Privacy, Wi-Fi Protected Access or other wireless network security standards.

Data storage 118 may be local, remote, or a combination thereof to network elements 110, 112, and 116. Data storage 118 may utilize a redundant array of inexpensive disks (RAID), a redundant array of inexpensive nodes (RAIN), tape, disk, or other computer accessible storage. In one or more embodiments data storage 118 may be a storage area network (SAN), an internet small computer systems interface (iSCSI) SAN, a Fibre Channel SAN, a common Internet File System (CIFS), network attached storage (NAS), or a network file system (NFS). Data storage 118 may utilize a file system, a database and/or other storage management tools and utilities.

Data storage 118 may be storage utilized for storing recorded calls, recorded call metadata, call recording orders or requests, call recording users, and/or other call recording data. In some embodiments, there may be multiple storage devices utilized. For example, recorded calls may be stored in one or more storage devices associated with a network element at which the call was captured, such as a voice response unit (VRU). A second or greater data storage device may be associated with a portal, or another centralized network element and may be utilized to store metadata associated with a call and/or call order information.

In one or more embodiments, network element 110 may be a VRU, network element 112 may be an application server, and network element 116 may be a voice portal. In these embodiments, a user may utilize network client 120 to access a voice portal represented by network element 116. The user may request the recording of one or more calls and may specify call recording parameters. The call recording parameters may determine which calls or portions of calls are recorded. The recorded information may be stored in data storage 118. Network element 116 may forward the call recording request to one or more voice response units, such as network element 110. When a call is received by network element 110, the VRU may determine if the call matches the parameters of a call recording request. The network element 110 may determine if it has adequate resources to record one or more portions of the call. For example, network element 110 may determine if it has free ports or channels to utilize for recording a conversation utilizing digital signal processing (DSP) capabilities of the VRU. The number of channels required may depend upon whether a user requested a full recording (e.g., inbound and outbound legs, both sides of a call) or a partial recording (e.g., one leg of call). For example, enhanced call routing applications on NGSN may be 'wholly' recorded (meaning the whole call and all extensions may be recorded) or 'partially' recorded (meaning segments of a call may be recorded.) A VRU may utilize unused ports on a DSP board to record the call. The VRU may connect to a call to be recorded in a listen only connection to one or more legs of the call. For example, for the recording of both the send and receive legs of a call a VRU may utilize two ports of a DSP board, one for each leg. The VRU may receive the call data from a DSP board or other DSP component and may perform processing on the data prior to streaming the data to a record server, an application server or other storage. For example, the VRU may put the data into packets or otherwise process the data so that it is in a standard format. Processing and/or putting the data into packets may ensure that call recording can be implemented in a similar manner on different types of networks. Processing the data may enable the same call recording implementation to be utilized on Time Domain Multiplexing (TDM) based networks, on IP based networks and on other types of networks. A VRU may encapsulate call data into Real-time Transport Protocol (RTP) packets. The RTP packets may be encapsulated in User Datagram Protocol (UDP) packets. The UDP packets may be captured using Packet Capture (PCAP). A PCAP file may be then transferred to a record server, an application server, and/or other storage. In one or more embodiments, DTMF (Dual-Tone Multi-Frequency) entries may be converted to RFC 2833 compliant packets. This may allow DTMF entries to be converted to packets and stored for subsequent rendering.

Prior to recording of a call, the VRU or another component may verify adequate storage space for a specified recording length or for an estimated recording length. For example storage space on a record server associated with the VRU or an application server associated with the VRU may be verified. A recorded call may be stored on an application server associated with the VRU such as network element 112. Metadata associated with a recorded call may be stored on storage associated with a voice portal. For example, metadata may be stored on a tools server or on storage associated with a tools server. The tools server may be utilized to provide call recording functionality to a voice portal. A voice portal and/or a web portal may provide a customer interface for entering call recording requests and parameters.

The various components of system 100 as shown in FIG. 1 may be further duplicated, combined and/or integrated to support various applications and platforms. Additional elements may also be implemented in the systems described above to support various applications.

Figure 2:
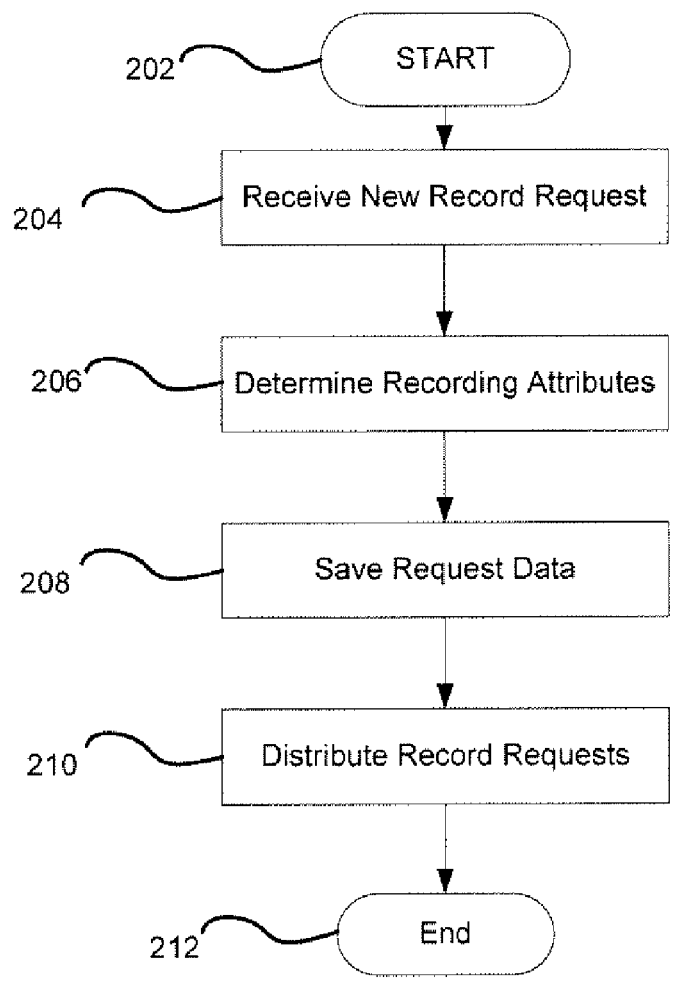
FIG. 2 depicts a method for placing a request for recording a call, in accordance with an exemplary embodiment.

FIG. 2 depicts a method for placing a request for recording a call, in accordance with an exemplary embodiment. The exemplary method 200 is provided by way of example, as there are a variety of ways to carry out methods disclosed herein. The method 200 shown in FIG. 2 may be executed or otherwise performed by one or a combination of various systems. The method 200 is described below as carried out by the system 100 shown in FIG. 1 by way of example, and various elements of the system 100 are referenced in explaining the example method of FIG. 2. Each block shown in FIG. 2 represents one or more processes, methods, or subroutines carried out in the exemplary method 200. A computer readable media comprising code to perform the acts of the method 200 may also be provided. Referring to FIG. 2, the exemplary method 200 may begin at block 202.

At block 204, a new recording request may be received. The new recording request may be received from a user via a voice portal. The voice portal may allow a user to enter a call recording request. For example, network element 116 may be a voice portal and a user at network client 120 may access network element 116 to submit a new recording request. In some embodiments, network element 116 may be a portal providing web based access for one or more users. In these embodiments, a user may utilize web based access to submit a call recording request and/or access other call recording functionality.

At block 206, a user may determine call recording attributes. For example, a user may specify whether to record all calls within a specified time range or a percentage of calls within a specified time range. A user may further identify calls to record by attributes such as calls related to a menu choice or option on a voice response unit, calls associated with a set of ANI (Automatic Number Identification) information, a calling party number, calls associated with Dialed Number Identification Service (DNIS) information, a called party number and other attributes.

At block 208, the call recording request may be saved. In one or more embodiments, the call recording request received by a voice portal may be saved to storage associated with a tools server. For example, in one or more embodiments, network element 112 may be a tools server and a call recording request may be saved to data storage 118.

At block 210, one or more portions of a call recording request may be distributed to one or more VRUs. In some embodiments, the parameters utilized to identify which portions of which call may be distributed to one or more VRUs or an intelligent peripheral associated with a VRU. For example, a tools server or another network component receiving a call recording request from a user may forward the desired start time and stop time of recording and other identifying information such as calling party information. One or more VRUs may receive the call recording request and may store the call recording request information. For example, network element 110 may contain a VRU and may receive one or more call recording requests.

At block 212, the method may end.

Figure 3:
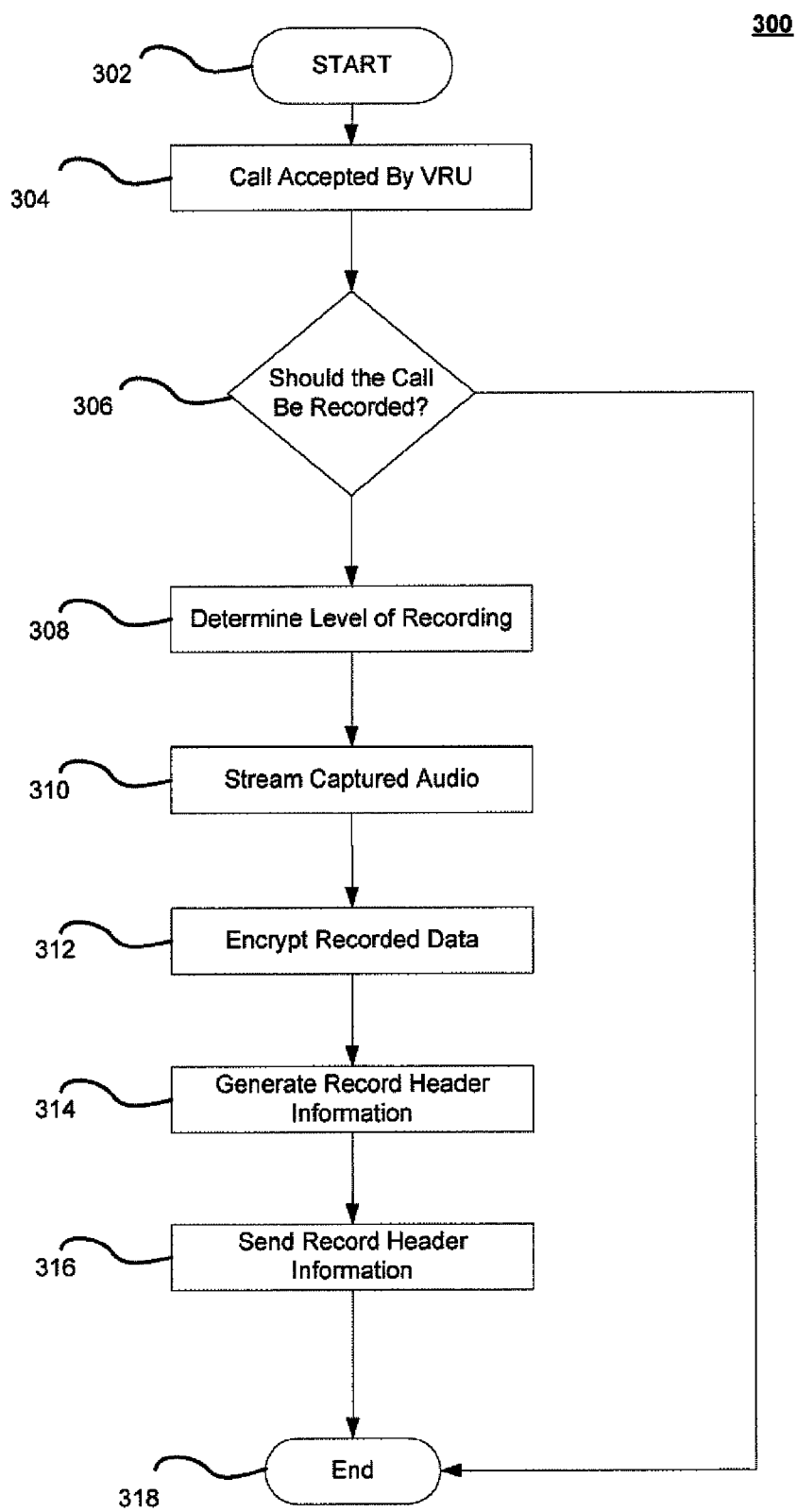
FIG. 3 depicts a method for recording a call on a network, in accordance with an exemplary embodiment.

FIG. 3 depicts a method 300 for recording a call on a network, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by the system 100 shown in FIG. 1 by way of example, and various elements of the system 100 are referenced in explaining the example method of FIG. 3. Each block shown in FIG. 3 represents one or more processes, methods, or subroutines carried out in the exemplary method 300. A computer readable media comprising code to perform the acts of the method 300 may also be provided. Referring to FIG. 3, the exemplary method 300 may begin at block 302.

At block 304, a call may be received by a voice response unit (VRU).

At block 306, the voice response unit may determine whether one or more attributes associated with the call, indicate that one or more portions of the call should be recorded. For example, a VRU may utilize Automatic Number Identification (ANI) data, Dialed Number Identification Service (DNIS) data, a time interval, the identity of a user application, a called party number or other information associated with the call and may determine that the call matches an existing call request. For example, a call request may specify all calls associated with a certain user application, such as a Interactive Voice Response (IVR) application, are to be recorded. The VRU may match an identifier associated with the IVR application against a call and may determine that the call is to be recorded.

At block 308, the level of recording may be determined. For example, the VRU may determine that only one leg or side of a call should be recorded based on the call request.

At block 310, the VRU may stream captured audio to an intelligent peripheral, a recording server, an application server or another device for recording. The recording device may be associated with the VRU and may not require transmission of the data over a network, or may require transmission of the data only over a local or dedicated network condition. This may reduce an amount of recording data on one or more networks. In one or more embodiments, the VRU may stream captured audio to an application server and may thus utilize resources deployed on the network for other applications. In some embodiments, the VRU may stream captured audio to a dedicated recording server, which may provide extended storage for captured audio.

At block 312, captured audio may be encrypted. In some embodiments, encryption may be performed by an intelligent peripheral, a recording server, an application server or another device which may be capable of storing captured audio. In some embodiments, the VRU or a device associated with the VRU may perform encryption prior to streaming the captured audio. The VRU may also perform other processing such as encapsulating call data into packets.

At block 314, a record header for the captured audio may be generated. A record header may contain metadata about the captured audio. A record header may be associated with the captured recording and may contain an identifier that uniquely identifies the captured recording. One or more pieces of data in a record header may be utilized to request and/or access the captured recording.

At block 316, record header information may be sent to one or more central locations. For example, record header information may be sent to a tools server or another networked resource accessible from a voice portal. The metadata in the record header may enable a user of a voice portal to search for and/or identify recorded audio.

At block 318, the method may end.

Figure 4:
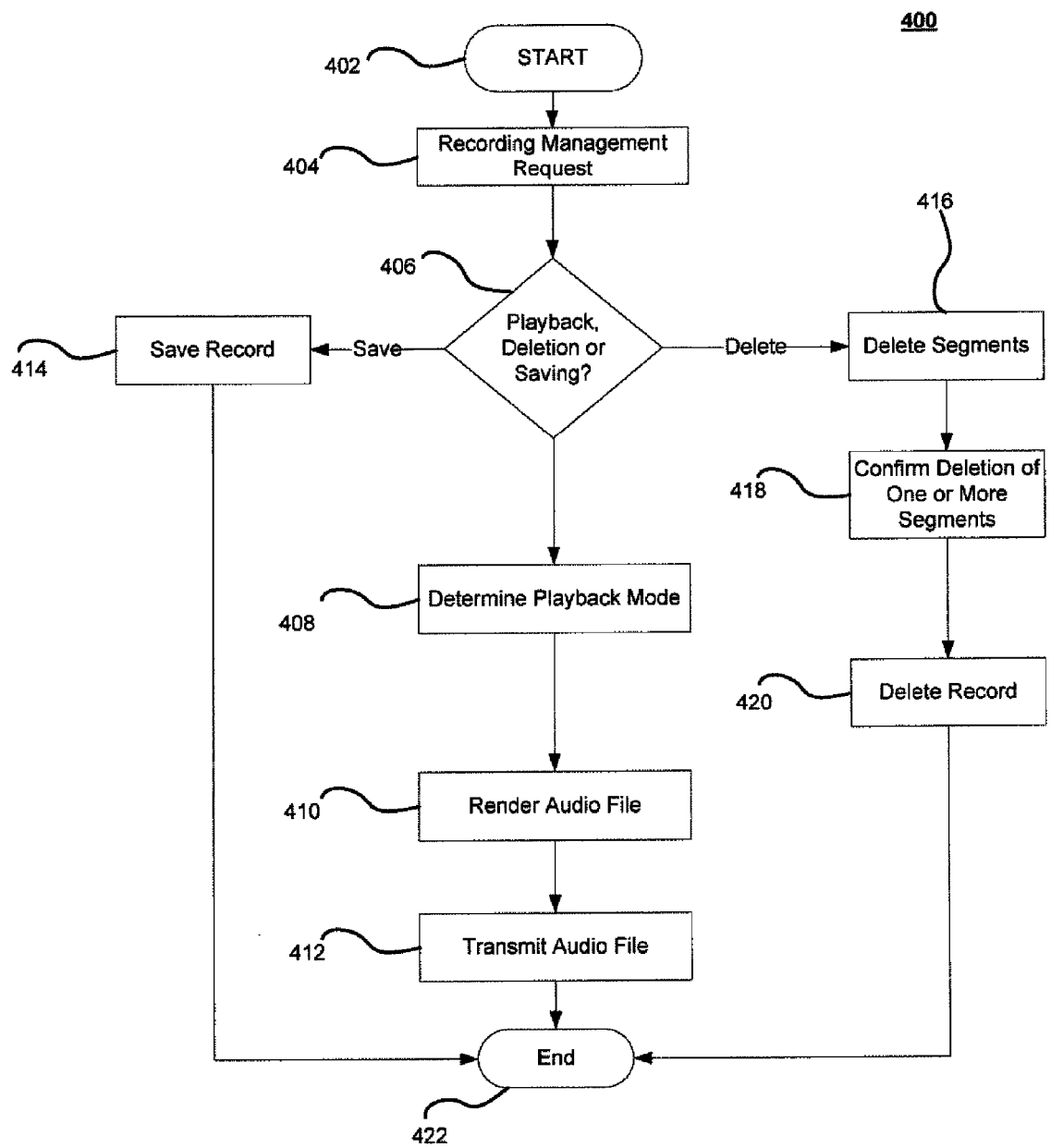
FIG. 4 depicts a method for managing a recorded network call, in accordance with an exemplary embodiment.

FIG. 4 depicts a method 400 for managing a recorded network call, according to an exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by the system 100 shown in FIG. 1 by way of example, and various elements of the system 100 are referenced in explaining the example method of FIG. 4. Each block shown in FIG.

4 represents one or more processes, methods, or subroutines carried out in the exemplary method 400. A computer readable media comprising code to perform the acts of the method 400 may also be provided. Referring to FIG. 4, the exemplary method 400 may begin at block 402.

At block 404, a recording management request may be received. According to one or more embodiments, the recording management request may be received at a voice portal. For example, network element 116 may be a voice portal which may receive a recording management request from a user at network client 120.

At block 406, the method 400 may determine the appropriate action for the recording management request. Recording management requests may include, but are not limited to, requests to playback recorded audio, delete captured audio, save captured audio, search captured audio, and/or set permissions for captured audio. If it is determined that the request is a request to save captured audio, the method 400 may continue at block 414. If it is determined that the request is a request to delete captured audio the method 400 may continue at block 416. If it is determined that the request is a request to playback captured audio, the request may continue at block 408.

At block 408, the play back mode may be determined. The play back mode may determine how to render a captured audio file. For example, an audio file may render only the send channel, may render only the receive channel, may render the send channel mixed with the receive channel, may render the send channel and the receive channel in stereo, may send the raw packet capture (PCAP) file, may include a rendering DTMF entries, or may otherwise render and/or format the captured audio file. This may be performed by an application server, a record server or another network element.

At block 410, the audio file may be rendered and/or decrypted. For example, network element 110 may be an application server or a record server which may render and/or decrypt one or more captured audio files.

At block 412, the audio file may be transmitted to the requesting user. The audio file may be formatted as a "Wave" file and sent utilizing HTTP or HTTPS. Other audio formats may be utilized.

At block 414, if it is determined that the management request is directed towards saving the audio file, the audio file may be saved. A tools server, a record server, an application server or another network element may set one or more attributes associated with an audio file indicating that the file is saved.

At block 416, if it is determined that the management request is directed towards deleting the audio file, one or more segments of the audio file may be deleted. A record server and/or an application server may delete the one or more segments in response to a request from a tools server, a voice portal or another network element.

At block 418, the method 400 may confirm deletion of one or more segments associated with a recording. In some embodiments, the method 400 may confirm the deletion of all segments associated with a recording, so that no orphan segments remain once a record associated with the segments is deleted. In some embodiments, one or more segments may be archived or may be exported to a user. For example, a user of a network call recording service may request tape copies of one or more recorded calls.

At block 420, the method 400 may delete one or more records associated with the recording. For example, a header record associated with the recording may be deleted at a tools server.

At block 422, the method may end.

Figure 5:
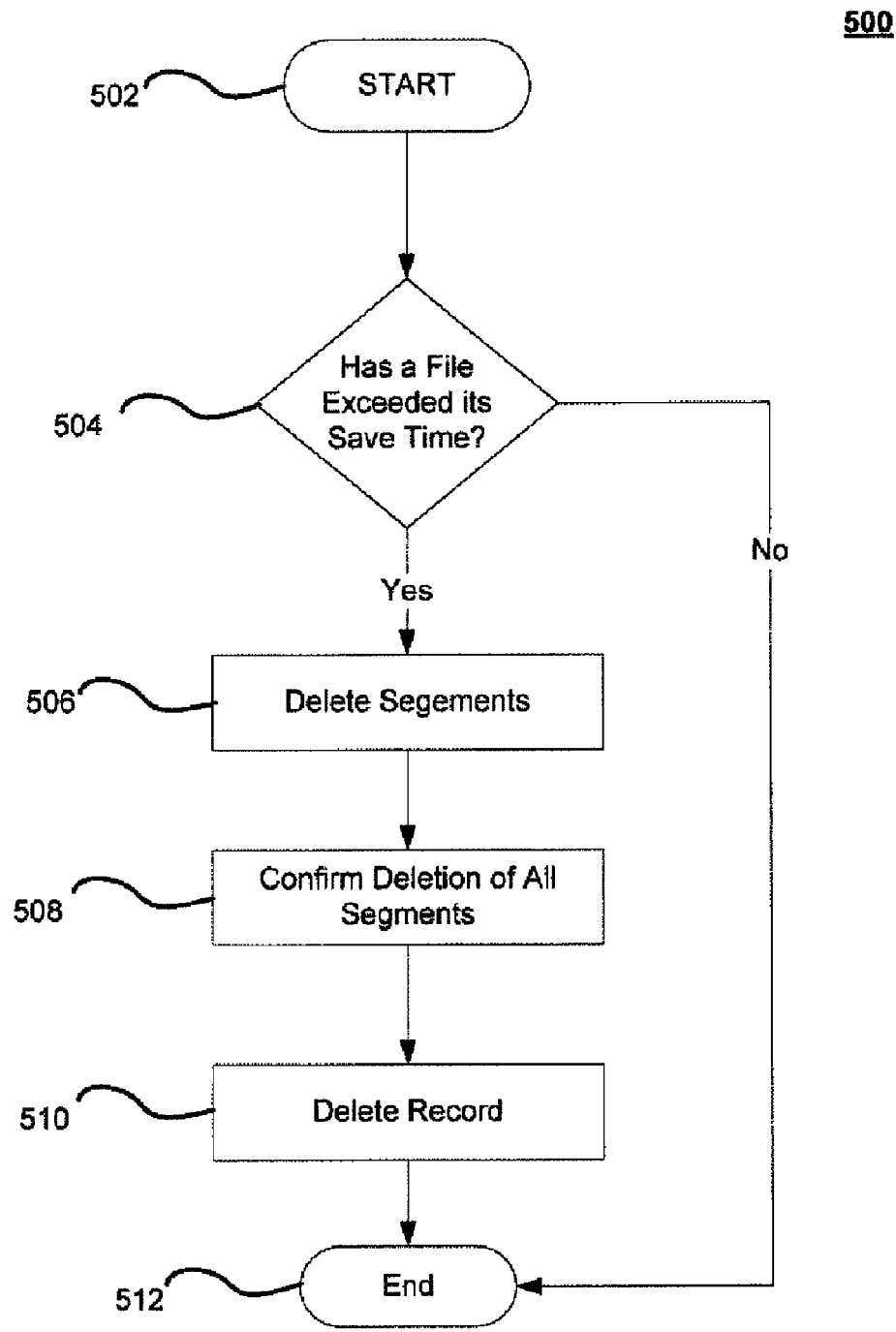
FIG. 5 depicts a method for managing expired network call recordings, in accordance with an exemplary embodiment.

FIG. 5 depicts a method for managing expired network call recordings, in accordance with an exemplary embodiment. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by the system 100 shown in FIG. 1 by way of example, and various elements of the system 100 are referenced in explaining the example method of FIG. 5. Each block shown in FIG. 5 represents one or more processes, methods, or subroutines carried out in the exemplary method 500. A computer readable media comprising code to perform the acts of the method 500 may also be provided. Referring to FIG. 5, the exemplary method 500 may begin at block 502.

At block 504, the method 500 may determine whether a recorded call file has exceeded its save time. In some embodiments, a user, a system administrator, or other authorized personnel may specify a period of time to save a recorded call. In one or more embodiments, a default save time may be utilized. In some embodiments, if a file has exceeded its save time a user, an administrator, or other authorized personnel may be notified and may be presented with an option to extend the save period by resetting the save date to a later date. If a file has not exceeded its save time, the method 500 may continue at block 512. If a file has exceeded its save time the method 500 may continue at block 506.

At block 506, one or more segments associated with an expired file may be deleted. An application server, a record server, or another network element may delete the one or more expired segments.

At block 508, the deletion of one or more segments may be confirmed. A tools server, an application server, a record server, or another network element may confirm the deletion of one or more segments.

At block 510, the record may be deleted. For example, a tools server may delete a header record containing metadata associated with the one or more expired segments.

At block 512, the method may end.

Referring to FIG. 6, a network call recording system is illustrated, in accordance with an exemplary embodiment. Time Domain Multiplexing (TDM) recording capability may be developed on a Next Generation Service Node (NGSN). It is appreciated that recording capability on an IP Contact Center (IPCC) may not be part of an initial release, but may be added in a future release. Therefore the design of TDM recording and the associated infrastructure may be consistent with a future IPCC recording feature.

The record capability developed on a Next Generation Service Node (NGSN) may include an order entry mechanism, a provisioning mechanism, the VRU platform recording capability, storage of recordings, security features, a user interface 618 to allow review and management of record data, and a User Acceptance Test (UAT) capability. The UAT capability may provide call recording capabilities similar or identical to production call recording capabilities. The UAT capabilities may utilize UAT hardware which may be deployed in a production environment and may enable UAT testing with production data and production users. A billing feed and sufficient storage capacity for a customer requiring storage of large amounts of data may be included in one or more embodiments of network call recording. One or more calls received by bridging switch 602 may be transferred to VRUs 606. Call control may be handled by a connection from bridging switch 602 to SS7 gateway 604 utilizing Signaling System 7 (SS7).

Whole call recording may be used in a 'self-service' mode by users of voice portal customer center 616, by support personnel in a managed service mode, and/or by other authorized users. The same tools server user interface may be used for one or more users.

FIG. 6 shows recording system elements in a TDM context, according to an exemplary embodiment. Enhanced Call Routing (ECR) calls treated on the Voice Response Units (VRUs) 606 capture call recording data and may store the data on a record server which may be associated with the VRUs 606. Initially, the record server may be implemented on an application server (AS) 610. This solution may only allow a small amount of record data to be stored. At a later date when demand for recording capability warrants it, dedicated hardware for record servers may be added at one or more sites, such as record storage 612, so that larger amounts of record data may be stored.

Customers may interact via a Voice Portal Contact Center (VPCC) 616 to place record orders and to manage record data. In some embodiments, Voice Portal Contact Center (VPCC) 616 may be a web portal providing web based access for users to call recording functionality. In one or more embodiments, Voice Portal Contact Center (VPCC) 616 may be a voice portal providing access to call recording functionality via spoken or audio commands from a user. A record order typically may specify an interval over which a percent of calls are recorded, a specific number of calls to record, or other parameters sufficient to determine which portions of one or more calls to record. Record order data may be stored in a tools server and forwarded to one or more application servers at record capable sites. In some embodiments record capable sites may utilize DM3 Dialogic cards and Intel Linux Intelligent Peripherals (IPs). Within a site one or more application servers may forward order data to one or more Intelligent Peripherals (IPs). The IPs may determine if a call may be recorded wholly or if a partial recording may be performed.

When a recording is performed, the actual recording data may be stored on site. Information about the recording may be forwarded to the tools server 608. This may allow a tools server 608 to be a central repository for one or more record orders. Tools server 608 may also record descriptive data and may not store one or more audio recordings. A customer may interact via a Voice Portal Contact Center (VPCC) 616 with tools server 608 in order to manage one or more record orders and/or recordings. If, for instance, a user wants a list of one or more recordings produced under a particular recording request, tools server 608 may provide that data. If the customer selects a recording to review, tools server 608 may send a message to an application server where the recording data may be stored. The application server may retrieve the data and may render the data in a "wave" format or another format suitable for playback on a users PC or other audio player. The rendered recording data then may be transferred to the customer via tools server 608.

Tools server 608 may receive information from a provisioning system (not shown) in order to facilitate creation of recording orders. For a specific corporation, a list of applications may be utilized along with an application indication that partial recording may be enabled. An HTTPS interface using XML with the following request response data may be utilized.

The provisioning system may support an HTTPS GET command approximately as follows:

```
GET /provisioningsystem1/recordingcorpquery?corpid=12345678
HTTP/1.1
Returns:
HTTP/1.1 200 OK
Date: Fri, 31 Dec 1999 23:59:59 GMT
Content-Type: text/xml
Content-Length: nnnn
<?xml version="1.0" encoding="UTF-8"?>
<recordingcorpquery>
   <corpid>12345678</corpid>
   <applicationslist>
      <applicationid>1234567</applicationid>
      <applicationid>1234568</applicationid>
      ...
   </applicationlist>
   <partialrecordapplications>
      <applicationid>1234569</applicationid>
      <applicationid>1234570</applicationid>
   </paritalrecordapplications>
</recordingcorpquery>
```

Where corpid is set to zeros, then one or more applications may be returned. The tools server may be enhanced to support failover. This may be automated or manually induced. The tools server may replicate data between the two or more servers. In some embodiments, thirty-five gigabytes (GB) of storage on each production application server may be made available for audio recording data. Six GB of storage on a UAT application server may be made available for audio recording. In other embodiments, other amounts of storage may be utilized on a tools server and/or a UAT server.

In one or more exemplary embodiments, only thirty-five GB of storage may initially be provided. Storage may be a limiting factor for call recording if large amounts of storage are not provided. The following table shows the amount of recording that may be supported with varying amounts of storage, according to an exemplary embodiment. Note that storage may not be the limiting factor if thirty terabyte or more of space is added per site.

| Storage | % Calls Recorded | MMM Record Rating/site | MMM Record rating 6 sites | Comment |
|---|---|---|---|---|
| 1 TB | .8% | .9 MMM | 5.4 MMM | |
| 2 TB | 1.6% | 1.8 MMM | 11 MMM | Starting Point |
| 5 TB | 4% | 4.5 MMM | 27 MMM | |
| 10 TB | 8% | 9 MMM | 54 MMMM | |
| 20 TB | 16% | 18 MM | 108 MMM | |
| 30 TB | 25% | 27 MMM | 162 MMM | Storage no longer limiting factor |

Adding storage may not cause a redesign. The design may allow for scale-ability. The initial design for audio storage may be scaleable to the ultimate storage size of 30 Terabytes per site. (TDM site)

FIG. 7 depicts communication between a network call recording system and a user, in accordance with an exemplary embodiment. Communications 702 shows the sequence of events occurring when a record server subscribes to Record orders. The SubscribeToRecordOrder method may be used by a record server or an application server to establish a subscription with a tools server. Following the successful subscription, the tools server may respond by sending record orders via the UpdateRecordOrders method. A record server and/or an application server may then have a list of one or more record orders. The list may be complete, filtered and/or partial.

VRUs may subscribe to record orders from a record server and/or an application server using the SubscribeToRecordOrders method. In response, a record server and/or an application server may forward one or more record orders using the UpdateRecordOrders method. One or more record orders may thus be passed from a tools server to a record server and/or an application server. The one or more record orders may then be passed from a record server and/or an application server to one or more VRUs.

Communications 704 illustrates the message flow when a user interacts to create a new order, according to an exemplary embodiment. One or more HTTP GET and/or HTTP POST commands and associated responses may be utilized to deliver one or more web pages as a user interacts. The interactions are between a user PC and the tools server may be via a Voice Portal Contact Center (VPCC) proxy within a DMZ (Demarcation Zone). The user may enter one or more portions of the data for an order which is shown as a HTTP PUT—new order. When a tools server receives this order data, it may process the order, save the data in its database, and use the UpdateRecordOrders method to pass the new order to one or more of the record servers and/or application servers that have subscribed to record orders. The record server and/or application server in turn may convey the order update information to one or more of the VRUs that have subscribed to record orders using the same UpdateRecordOrder method.

The Record Order Entry Service may exist on the tools server and/or the record server (which may also be implemented on one or more application servers). The Record Order Entry Service may have the SubscribeRecordOrders method. This method may be implemented as a web service using SOAP. FIG. 7 illustrates the context in which SubscribeRecordOrders may be used, according to an exemplary embodiment.

The SubscribeRecordOrders method may allow clients to subscribe to the Record Orders.

The SubscribeRecordOrders method may have the following inputs:

| Name | Description | Type |
| --- | --- | --- |
| uri | specifies the URI to send orders to | string |
| expires | Specifies an expiration time duration for the subscription | Integer (in seconds) |
| RetreiveAllOrders | if true then respond with one or more current orders (pending) immediately and any new orders that occur subsequently. Otherwise respond with any new orders that occur subsequently. | Boolean |
| SubscriptionType | Specifies if the subscription values may may be for production orders or test orders | String where the be: 'production' 'test' |

Return Parameters: None.

As specified in FIG. 7, web service method SubscribeRecordOrders may be provided to allow site recording servers to subscribe to record orders. The tools server may maintain subscription data received by SubscribeRecordOrders so that order updates may be transmitted to parties that subscribe for the types of record orders they subscribe to (production or test) as specified by the SubscriptionType parameter. When the 'RetrieveAllOrders' parameter of the SubscribeRecordOrders is 'true', the tools server may immediately send one or more applicable record orders to the requesting site. The tools server may cease sending order updates when a subscription expires (and has not been renewed) as specified by the 'expires' parameter of the SubscribeRecordOrders.

The Record Order Entry Listener Service may exist on the Intelligent Peripherals (IP) and the record server (which initially may be implemented on the application servers).

The Record Order Entry Listener Service may have the UpdateRecordOrders method. This method may be implemented as a web service using SOAP. FIG. 7 illustrates the context in which UpdateRecordOrders may be used according to an exemplary embodiment.

The UpdateRecordOrders method may allow clients to receive Record orders. The record server may receive updates from the tools server and may distribute these to Intelligent Peripherals (IPs).

The UpdateRecordOrders method may include the following inputs:

| Name | Description | Type |
| --- | --- | --- |
| orders - array of order | Array of orders | Array of structure |
| Order | Data for an order | Structure composed of: |
| ApplicationID | Specifies the application ID that the order applies to | String. 7 digits |
| RecordOrderID | identifies the order | string |
| CorpID | Corporation ID | String |
| OrderType | Specifies order type | String with values: 'full' 'partial' |
| RecordStartTime | Time that record order starts | Integer representing epic GMT time |
| RecordStopTime | Time that record order stops | Integer representing epic GMT time |
| OrderUpdateTime | Time that order or order change was made | Integer representing epic GMT time |
| Percentage | The percentage of calls that will be recorded | String representing coded decimal |

Return parameters: None

When a record server receives an UpdateRecordOrder message from a tools server it may save the record order data, and send this data to one or more of the VRUs that have subscribed to record orders. A Record Order Entry Service as described in FIG. 7 may be utilized on a tools server.

FIG. 8 depicts communication between components of a network call recording system, in accordance with an exemplary embodiment. FIG. 8 is the event flow for a recording. The SS7 (Signaling System #7) messaging associated with a call arrival is shown. A new call may arrive at the VRU and may be accepted. This is depicted in FIG. 8 showing the flow of SS7 Initial Address Messages (IAM), Address Complete Messages (ACM), Answer Messages (ANM), MSP Call Offered, Answer, Connect, and return result messages. The VRU may have new incoming call processing to determine if the call needs to be recorded wholly or partially recorded. This flow illustrates the case where the call may be enabled for partial recording. The application may begin and may control interaction with a caller. At some point in the call flow, recording may be enabled (e.g., at the point where an agent is outdialed). The VRU may then begin streaming one or more portions of captured audio to a record server. This is shown as an HTTPS (Hypertext Transfer Protocol over Secure Socket Layer) PUT. In the example given, two recordings are shown which may be captured as two separate audio segments.

The SS7 and MSP (MCI Signaling Protocol) release messages shown (SS7 REL (Release Message) and RLC (Release Complete Message) and MSP Release and RR (Return Response) may occur upon termination of the call. Once the call is over, the VRU may forward the recording metadata (e.g start time, Uniform Resource Identifier (URI), Automatic Number Identification (ANI), Dialed Number Identification Service (DNIS), etc.) to a record server using the FulfillRecordOrder method. The record server in turn may use the same method to send the data to a tools server.

Two responses are shown from the tools server. The first is a HTTP status code of "200 OK" indicating the tools server accepts the data. An HTTP server error code or "5xx response" may occur if the tools server already has enough recording data for the order. In this case, the record server may delete one or more portions of recording capture data.

One or more of incoming calls may be screened to determine if the incoming call may be to be recorded wholly or partially.

The full call may be recorded fully if:
(a.) an order is present that indicates full call recording;
(b.) the current time interval falls within the record start and stop times; and
(c.) percentage of recording is 100 percent or percentage is less than 100% but falls within the percentage specified in the order.

The call may be enabled for partial recording if
(a.) an order is present that indicates partial recording;
(b.) the current time interval falls within the record start and stop times; and
(c.) percentage of recording is 100 percent or percentage is less than 100% but falls within the percentage specified in the order.

When partial recording is enabled, the VRU may enable application control via action functions of recordings within a call plan for leg 1, 2, or 3. When partial recording is not enabled, the VRU may ignore application recording control via action functions.

For calls that are to be recorded fully (whole call), the send and receive of channel 1 (the inbound leg) may be captured for the duration of the call. One call recording segment may be created for a whole call recording. A call recording segment may be an audio capture file containing send and receive audio for the channel recorded.

For calls that are to be partially recorded, the action functions may determine for example, on which channel recording may occur and when the recording starts and stops. For partial call recording zero or more call recording segments may be created.

Captured audio may be stored at a location on site, which may be an application server and/or a record server. Captured audio may be encrypted using one or more encryption methods, such as, a randomly generated 128 bit key and/or Advanced Encryption Standard (AES).

When a recording segment is complete which may be determined by the end of a call or an action function, a record header (e.g., data specified in FulfillRecordOrder method) may be created and may be sent to the RecordOrderFulfillment Service. For example, the record header may be sent using the FulfillRecordOrder method as specified in greater detail below.

Captured audio may include RFC 2833 packets. This may support a rendering mode in which DTMF (Dual-Tone Multi-Frequency) entries on a call may be translated to a listener. For example, the recording might sound like this " . . . (Intelligent Voice Response (IVR)) "Please enter your selection now." (Caller presses the button for two, but rendering translates DTMF corresponding to button two to audio corresponding to the selection.) "Two." (IVR) "Thank you. If you would like to hear your account balance press . . . ."

New action functions utilized for the recording capability may include: AudioCaptureStart, AudioCaptureStop, IsCallEnabledForRecord, IsCallBeingRecorded, and AddApplicationDataToRecordHeader.

A new action function AudioCaptureStart may be added that may cause recording to start on a specified channel. If the application is already performing whole call recording or the application is not enabled for partial recording, or is enabled for partial recording but the application does not fall in the specified recording percentage, this action function may be ignored. If the action is not ignored (not already performing whole call recording, not enabled for partial recording, or not falling within the percentage) and the audio capture can not be initiated due to a resource constraint, then a status indicating the resource constraint may be returned. This action function may optionally allow a name to be provided that may be passed in the FulfillRecordOrder method. This may provide useful information that a user may include in a recording search.

A new action function AudioCaptureStop may be added that may cause recording to stop on a specified channel. If recording is not in progress on the specified channel, then the action function may be ignored.

A new action function IsCallEnabledForRecord may be added that may return true if any channel in the call is in the process of being recorded or if the application is enabled for partial recording and the call falls within this specified percentage in the record order.

A new action function IsCallBeingRecorded may be added that may return true if the call is currently being recorded on any channel.

A new action function AddApplicationDataToRecordHeader may be added that may allow data to be passed from the Service Creation Environment (SCE) built application to the VRU for incorporation into the Record header. Data may be passed as ParameterName, ParameterValue. Each time AddApplicationDataToRecordHeader is executed, AddApplicationDataToRecordHeader may add the ParameterName, ParameterValue specified to the data it includes in the Record Header.

A new Service Independent Building Block (SIBB), the Audio Capture SIBB, may document when the Audio Capture (Recording) is used. This SIBB may not be an actual SIBB that appears in the Call Builder Service Creation Tool. This SIBB Platform Call Record (PCR) entry may be created by the VRU when an action function is used in the VRU that either starts or stops recording for a specified channel or at the beginning and end of a PCR when whole call recording is performed.

The SIBB description may be as follows:

| SIBB Description | Elements |
|---|---|
| Audio_Capture —The Audio_Capture SIBB may record when audio capture actions are initiated and/or terminated. | time_start (548) action (679) channel (507) request_uri (649) capture_type (803) |

There may be a new SIBB element for the Audio_Capture SIBB—the Capture_Type element with an ID of 803. Capture_Type may have values of 1=whole call recoding, 2=partial recording. Reporting may be able to accept PCRs with the new Audio_Capture SIBB.

The record fulfillment service may be implemented on a record server, an application server and on a tools server. This service may contain the method FulfillRecordOrder.

The FulfillRecordOrder method may allow a client, such as an intelligent peripheral or a record server, to send information regarding calls that have been recorded to the server (the record server or the tools server). FIG. 8 shows the context in which this method may be used.

The FulfillRecordOrder method may include the following inputs:

FIG. 9 depicts communication between a network call recording system and a user, in accordance with an exemplary embodiment. Communication 902 shows the sequence when the user requests playback. The play back may be initiated via interaction between the user's PC and the tools server. The request is shown as an HTTPS GET request. The tools server, when it receives this request, may send a HTTPS GET request to the record server that has the audio data for the record segment selected. The record server may recover the file and render the file the way the user has requested it, for example, as a "WAVE" file (send only, receive only, send and receive mixed, send and receive in stereo, or the raw Packet Capture

| Name | Description | Type |
| --- | --- | --- |
| RecordingFulfillmentData | A structure with information pertaining to one or more recording segments with the following components. | Structure |
| RecordOrderID | identifies the order | string |
| CallingPartyNumber | Telephone number or URI of calling party | String tel uri |
| CalledPartyNumber | Telephone number or URI of called party | String tel uri |
| SiteID | Identifies site sending the data | String |
| ServerID | Identifies server sending the data | String |
| RecordingFulfillmentApplicationData | Multiple instances of application specific data that has the following | Array of Structure |
| name | The name of the application data | String |
| value | The value of the application data | String |
| RecordingFulfillmentRecordingSegment | Multiple instances data pertaining to a recording segment that has the following data | Array of Structure |
| StartTime | Recording segment start time | Integer representing epic GMT |
| StopTime | Recording segment stop time | Integer representing epic GMT |
| Name | A name provided by the action function that starts the recording | String |
| uri | URI of the recoding segment file | String |
| SessionInfo | Provides session information in a URL encoded format as follows: param = vaule¶m = value&etc. Parameters identified thus far are: local: the destination IP 'address:port' of the local RTP port, remote: the destination IP 'address:port' of the remote RTP port media: definition and mapping of session media types in the form payload_id:mime_type, payload_id:mime_type example: local=192.168.1.1:10000& remote=192.168.1.2:8000& media=0:audio/basic, 101:audio/telephone-event | String |
| EncryptionKey | 128bit key used to encrypt/decrypt the audio segment. | Hexadecimal |

Note that one or more clients using the FulfillRecordOrder method (e.g., a VRU and/or a record server) may be responsible for cleaning up data when a failure response is returned. For example, if a VRU sends a FulfillRecordOrder and a record server response is negative, then the VRU may delete one or more recording segments. If the VRU successfully sends a FulfillRecordOrder to the record server, the record server may, in turn, send a FulfillRecordOrder to the tools server. If the tools server returns a 'reject' response, then the record server may delete one or more portions of recording segment data. A record fulfillment service as described in FIG. 8 may be implemented on a tools server.

(PCAP) file) The "WAVE" file may be passed back to the user in the HTTPS GET response. The user then may play the file using a media player.

Communication 904 shows a delete sequence, in accordance with an exemplary embodiment. User interaction may precede the delete in order to see lists of recordings and select the recording to be deleted. The initiation is shown as a HTTPS Delete. The tools server, when it receives this deleted request, may use the DeleteRecordingSegments method to command deletion of the recording segment at the appropriate record server. Once an acknowledgement is received, the tools server then may delete one or more segments.

Communication 906 illustrates an exemplary SAVE request. The SAVE may be initiated via a HTTPS POST request after user interaction (not shown). The HTTPS POST request received by the tools server may trigger the tools server to change the attributes of one or more record segments so that it may be retained for the requested period of time.

The tools server may use HTTPS to retrieve audio files from an application server. The URI in the request may identify the audio file, the method of rendition, the encryption key and session information necessary for rendering. For example, the URI may be structured as follows:

```
GET /site1/AS1/recording000005678217RenderType=sendreceivewave
&EncryptionKey=
A72F905498C4398DFA72F905498C4398DF&SessionInfo=
local=192.168.1.1:10000&remote=192.168.1.2:8000&media=
0:audio/basic,101:audio/telephone-event
HTTP/1.1
```

In one or more embodiments, there may be multiple possible RenderTypes including:
1. sendwave may render only the send channel
2. receivewave may render only the receive channel.
3. sendreceivewave may render send mixed with receive
4. stereowave may render send and receive in a stereo
5. pcap may send the raw PCAP file The EncryptionKey and SessionInfo may be as received in the FulfillRecordOrder. The record server, which may be implemented on an application server initially, and may support a HTTPS GET request from a tools server that may return a specified record file segment rendered wave file as specified in the URI. For example, MIME type: audio/wav, No compression—PCM with mu-law encoding. An exemplary context of this GET request is shown in FIG. 9.

A record deletion service may be utilized on the record server so that the tools server may be able to command deletion of a record segment. Note that the tools server may control one or more deletions. Granularity of deletion may be at the segment level within a call as opposed to the call level. A record deletion service may be implemented as a web service utilizing a DeleteRecordings method. Use of the DeleteRecordings method is shown in FIG. 9 and FIG. 10.

The DeleteRecordings method may allow a tools server to command deletion of a specified recording or a number of recordings.

The DeleteRecordings method may include the following inputs:

| Name | Description | Type |
|------|-------------|------|
| Array | An array that specifies the uri's to be deleted. | Array |
| uri | identifies the record segment file to delete | string |

Return parameters: None.

FIG. 10 depicts communication between components of a network call recording system, in accordance with an exemplary embodiment. FIG. 10 illustrates a clean up process for expired audio recordings. The tools server may manage one or more audio record file segments stored at one or more record servers. When a record segment has exceeded it's save time, the record server may issue a delete request. This may occur as a result of an administrative command, on a nightly basis, a weekly basis, based upon an amount of space available on one or more application servers or record servers, or based upon other schedules or relevant criteria. The tools server may create a list of files that need to be deleted and may administer one or more deletions using the DeleteRecordSegments method.

In one or more embodiments, record data recovery may be available. This may enable the recovery of files which have been marked for deletion but not yet deleted or overwritten. In some embodiments, this may enable the recovery or record orders and/or audio files from one or more record servers and/or VRUs.

FIGS. 11a and 11b depicts entity relationship diagrams, in accordance with an exemplary embodiment. The tools server may maintain record user, order, and recording header data, and/or other network call recording data. An exemplary embodiment of the specifics of the data maintained is shown in tables that follow. Entity Relationships between these tables are shown in FIGS. 11a and 11b.

The Corporation table may have data at a corporation level that may be pertinent to recording such as a corporate default for recording storage time.

| Data Item | Description | Range of Value | Mandatory/Optional |
|-----------|-------------|----------------|--------------------|
| CorpID | Numeric identifier for corporation | 00000000-99999999 | Mandatory, Primary Key |
| DefaultRecordStorageTime | The amount of time a recording will be saved in days | 0000-9999 | Optional |
| DefaultRecordSecurity | Indicates the security level of recordings | 1 = None<br>2 = Sensitive | Optional |

The application table may contain data at an application level pertinent to recording. Whether the application is enabled for full or partial recording may be one such data item.

| Data Item | Description | Range of Value | Mandatory/Optional |
|-----------|-------------|----------------|--------------------|
| ApplicationID | Numeric identifier | 0000000-9999999 | Mandatory, |

-continued

| Data Item | Description | Range of Value | Mandatory/Optional |
|---|---|---|---|
| CorpID | for application Numeric identifier for corporation | 00000000-99999999 | Primary Key Mandatory |
| FullPartial | Indicates whether recording is full (whole call) or partial | 1 = Full 2 = Partial | Mandatory |

The RecordOrder table may contain one or more portions of the data for a record order such as when recording may start and what percentage of calls to record.

| Data Item | Description | Range of Value | Mandatory/Optional |
|---|---|---|---|
| RecordOrderID | Numeric identifier for a record order | 0000000000-9999999999 | Mandatory, Primary Key |
| ApplicationID | Numeric identifier for application | 0000000-9999999 | Mandatory |
| ProductionTest | Indicates whether recording order is for the production or test sites | 'production' or 'test' | Mandatory |
| UserID | Identifies the user that first created the order | 0000000000-9999999999 | Mandatory |
| RecordStartTime | Time at which to begin recording | Exemplary Format Mask: "Mmddyyyyhh" Where Mm = month 1-12 dd = day 1-31 yyyy = year 2007-9999 hh = hour 0-23 | Mandatory |
| RecordStopTime | Time at which to stop recording | Exemplary Format Mask: "Mmddyyyyhh" Where Mm = month 1-12 dd = day 1-31 yyyy = year 2007-9999 hh = hour 0-23. This may be a time after RecordStartTime. | Mandatory |
| Percent | The percent of calls to record 1 | 00.00-100.00 | Optional - either Percent or NumberOfCalls may be entered |
| NumberOfCalls | The number of calls to record | 0-999 | Optional - either Percent or NumberOfCalls may be entered |
| OrderType | Indicates whether recording is full (whole call) or partial | String with values 'full' 'partial' | Mandatory |
| Status | The state of the order | 1 = Pending 2 = Complete 3 = Cancelled | Mandatory |
| RecordStorageTime | The amount of time a recording will be retained in days. | 0000-9999 (Days) If this field is not entered use DefaultRecordStorageTime. If no value for that then the default storage time may be seven days. | Optional |
| RecordSecurity | Indicates the security level of recordings | 1 = None 2 = Sensitive If this field is not entered DefaultRecordSecurity may be used. If that is not provided then it may be defaulted to none. | Optional |

¹Note that when a percentage of calls to record is specified, the actual number of calls recorded may be governed by the laws of probability. For instance if the percentage of calls to record is set to 50% and 4 calls are made then one would expect that 6.25% of the time no calls would be recorded, 25% of the time one call may be recorded, 37.5% of the time two calls may be recorded, 25% of the time 3 calls may be recorded, and 6.25% of the time all 4 calls may be recorded.

The RecordUser table may contain user and user privilege information.

| Data Item | Description | Range of Value | Mandatory/Optional |
|---|---|---|---|
| UserID | Numeric identifier for a user. | 0000000000-9999999999 | Mandatory, Primary Key |
| CorpID | Numeric identifier for corporation | 00000000-99999999 | Mandatory |
| Privs | Delineates privileges that user has. | This may utilize a variety of formats including a list, a numeric code, roles and/or other formats. | Mandatory |

The UserToApplication table may define the many to many mapping from the RecordUser table to the Application table. A single user may order and manage recordings for many applications. A single application may have many users managing recordings.

| Data Item | Description | Range of Value | Mandatory/Optional |
|---|---|---|---|
| UserID | Numeric identifier for a user. | 0000000000-9999999999 | Mandatory, Primary Key |
| ApplicationID | Numeric identifier for application | 0000000-9999999 | Mandatory, Primary Key |

The AuditableActions table may contain a record of significant user actions. The table may capture actions such as creation of an order, modification of an order, deletion of an order, listen to a recording, save a recording, and/or delete a recording.

| Data Item | Description | Range of Value | Mandatory/Optional |
|---|---|---|---|
| UserID | Numeric identifier for a user. | 0000000000-9999999999 | Mandatory, Primary Key |
| DateTime | Time at which the action occurs. | Exemplary Format Mask: "Mmddyyyyhhmmss" Where: MM = month Dd = day Yyyy = year Hh = hour Mm = minute Ss = second | Mandatory, Primary Key |
| Action | Identification of the action taken | This may utilize a variety of formats including alphanumeric identifiers, codes and other formats. | Mandatory |
| RecordOrderID | Numeric identifier for a record order | 0000000000-9999999999 | Mandatory, Primary Key |
| RecordingID | Identification of a recording created when a FulfillRecordOrder is processed | integer | Optional, present if action pertains to a specific FulfillRecordOrder |
| uri | Universal Resource Locator for the audio file associated with the Record Segment | string | Optional, present if action pertains to a specific recording segment |

The Recording table may contain the RecordingFulfillment data from the FulfillRecordOrder method. This data may be common to one or more FulfillmentRecordingSegments received with the FulfillRecordOrder.

| Data Item | Description | Range of Value | Mandatory/Optional |
|---|---|---|---|
| RecordingID | Identification of a recording created when a FulfillRecordOrder is processed | integer | Mandatory, Primary Key. |
| RecordOrderID | Numeric identifier for a record order | 0000000000-9999999999 | Mandatory |
| CallingPartyNumber | Calling Party Telephone number or uri | string | Optional |
| CalledPartyNumber | Called Party Number or uri | string | Optional |
| SiteID | Identifies site | String | Mandatory |
| Server ID | Identifies server | String | Mandatory |

The Segment table may contain recording segment data from the FulfillRecordOrder method. There may be one or more recording segments associated with the FulfillRecordOrder data.

| Data Item | Description | Range of Value | Mandatory/Optional |
|---|---|---|---|
| uri | Universal Resource Locator for the audio file associated with the Record Segment | string | Mandatory, Primary key |
| RecordingID | Identification of a recording created when a FulfillRecordOrder is processed | integer | Mandatory |
| StartTime | Identifies start time of recording segment | Integer represents epic GMT time | Mandatory |
| StopTime | Identifies stop time of recording segment | Integer represents epic GMT time | Mandatory |
| Name | An identifier from the AudioCaptureStart action function | String | Optional |
| SessionInfo | Identifies session information in a URL encoded format. This data may be necessary for rendering. Format details are provided above in reference to FIG. 8 and the record fulfillment service. | String | Mandatory |
| TimeToLive | Specifies a time that the recording segment will be retained | Integer (represents days) | Mandatory |
| EncryptionKey | 128 bit key for AES encryption | 128 bit binary | Mandatory |

The Parameter Name table may contain one or more parameter names as specified in RecordOrders. Parameter Names may be parameters that may be received from the FulfillRecordOrder method. This may provide a way for application specific data to be sent with recording data. Sending application specific data with a recording may allow a user to find specific recordings such as one or more calls to a specific agent.

| Data Item | Description | Range of Value | Mandatory/Optional |
|---|---|---|---|
| ParameterID | Identification of Parameter name | integer | Mandatory, Primary key |
| ParameterName | ParameterName | String | Mandatory |
| RecordingID | Identification of a recording created when a FulfillRecordOrder is processed | integer | Mandatory |
| ParameterValue | The value of the parameter | String | Mandatory |

The Parameter Value table may contain recording fulfillment application data from the FulfillRecordOrder method. Specifically, this table may contain the parameter values sent. There may be one or more portions of recording fulfillment application data associated with the FulfillRecordOrder data. Application data may be of the form parameter name and parameter value.

| Data Item | Description | Range of Value | Mandatory/Optional |
|---|---|---|---|
| ParameterID | Identification of Parameter name | integer | Mandatory, Primary key |
| RecordingID | Identification of a recording created when a FulfillRecordOrder is processed | integer | Mandatory |
| ParameterValue | The value of the parameter | String | Mandatory |

FIG. 12 is flowchart depicting relationships between call recording management screens, in accordance with an exemplary embodiment. Tools server recording events may fall into three categories: user interface events; recording site events; and internal events.

FIG. 12 presents a summary of exemplary order entry screens. This is merely a representation of the type of user interactions that may be utilized.

User Login 1202 illustrates a login capability that may prevent unauthorized access In order to be logged in, a user may have to be configured by a system administrator. Once a user has successfully logged in user privileges may determine the actions allowed. A system administrator, a designated corporate administrator, or other authorized user may be able to set and modify user privileges.

The available choices as determined at least in part by a user's privileges, may be displayed in main menu 1204. As illustrated, main menu 1204 may provide access to top level menus and/or other functionality. For example, main menu 1204 may provide access to manage users 1206, manage orders 1208, and/or manage recordings 1210.

Manage Users 1206 and User Detail 1214 may enable an authorized user to add and delete users, reset user passwords and set user privileges. Users may be associated with one or more corporations. The system may optionally allow a user to be associated with specific applications belonging to a corporation, organization, group and/or role. Users may only be able to manage orders and recordings for the corporations, applications, organization, group and/or role they may be associated with. User creation, user deletion, password modification, and changes to user privileges may be captured as auditable events.

Manage Orders 1208 and Order Detail 1216 may enable authorized users to view, create, modify, and delete orders for recordings. Record orders may specify information called out in the above Record Order Table. User requests to create, modify, or delete orders may be captured as auditable events.

Manage Recordings 1210 and Recording Detail 1218 may enable authorized users to view, search for recordings, view lists of recordings associated with an order, save recordings, listen to recordings, download recording files, and delete recordings. The interface may support the methods of file rendition called out in FIG. 9.

The user interface may provide a recording search tool 1212 to allow users to search through recordings to locate recordings that meet search criteria. Search criteria may include one or more of the following: Application ID; CallingPartyNumber; CalledPartyNumber; AudioCaptureName; Production/Test; Order Number; Recording type; Record start; Record stop; and Application associated data (e.g., parameter names and associated values).

User requests to listen to, save, or delete recordings may be captured as auditable events. Recording events from sites may include subscribe, unsubscribe, and arrival of record header data.

FIG. 13 is a flowchart depicting different call recording request states, in accordance with an exemplary embodiment.

As specified in reference to FIG. 8 above, web service method FulfillRecordOrder may be provided to allow site application servers to send record header data to the tools server. When the tools server receives Record Header data from a site and the record order that it pertains to is in state 'pending', it may record the data, assign a TimeToLive to the recording, and may re-evaluate the state of the order. Exemplary order states are shown below. Orders where the stop time has not been reached may be 'pending', orders where the stop time has been reached may be 'complete', and orders where the stop time is zeroed out may be 'cancelled'.

When the tools server receives Record Fulfillment data from a site and the record order that it pertains to is not in the state 'pending' then the tools server may use the DeleteRecordings method to notify the sending application server that the recording audio may be deleted. For orders that transition to complete due to meeting a specified number of calls, the tools server may also use the UpdateRecordOrders method to indicate that the order is complete so that the VRU may not continue to make recordings for the order that may not be needed and may have to be deleted. If, for instance, an order specifies recoding of twenty-five messages, the tools server may, for example, get more than twenty-five messages before all the sites may be updated with the current information that cancels the order. If the tools server receives Record Fulfillment data from a site that does not have a current registration, then the tools server may return an error message and may not store the data. If the tools server receives Record Fulfillment data with application data (parameter names and values) and the parameter names are not in the Parameter Name table, then the application data may be discarded. However, other fulfillment data may be stored.

When record fulfillment data is received, the tools server may assign a TimeToLive to one or more recording segments. When record fulfillment data is received and stored by the tools server, the stored data may include the EncryptionKey associated with the recording segment.

Internal tools server events may include time triggered order cancellations and periodic cleanup of recording files.

Time triggered order cancellations: When an orders RecordStopTime occurs, the tools server may place the order in 'Complete' status.

Periodic Clean-up: The tools server may maintain the TimeToLive associated with a recording segment. When the TimeToLive reaches zero, the tools server may initiate deletion of the recording data on the site where the audio data may be stored using the DeleteRecordings method. If the delete is successful, then the tools server may purge it's database of the record segment data. When one or more portions of segment data is deleted for a specific RecordingID, then associated Recording data may be purged.

The tools server may not consider a record segment deleted until it receives positive acknowledgement of the successful deletion from the record server. The tools server may manage the recording data for one or more record servers. When a deletion occurs, the tools server may log an event in the AuditableActions table.

FIG. 14 depicts a call recording report, in accordance with an exemplary embodiment. An exemplary method of billing may be to charge a user monthly amounts for: a total number of minutes that were recorded; and a total amount of storage space used. (short term and long term).

A nightly feed of summarized billing data may be provided to a billing system. The tools server may produce a nightly report that details the amount of audio capture minutes used by each corporation by application.

Report versions specific to a corporation id, a user or other customized reports may be created. Reports may be run on demand, daily, weekly, monthly or at other intervals.

FIG. 15 depicts a call recording report, in accordance with an exemplary embodiment.

The tools server may produce a nightly report that details the amount of audio storage required by each corporation by application.

The audio capture reports may be maintained for a set period of time, e.g., 60 days.

FIG. 16 depicts a block diagram of a system architecture for network call recording, in accordance with an exemplary embodiment. FIG. 16 highlights features of the design that may ensure a high level of audio recording security. As shown secure communication may be utilized between VRUs 606, Record Server 612, Tools Server 608, Database 1604 and User 1602. Security measures may include the use of encryption, secure protocols, and physical security. One or more portions of call recording data may be confidential and may be given a high level of protection. Within a site, one or more portions of record data may be transferred using HTTPS. One or more portions of Record data stored on a site may be encrypted. Encryption keys for audio segments may not be stored on site. Record data may be only stored long term on VRU/IPIVR sites. Audio segment encryption keys may be stored on a tools server. Access to record data may be limited to authorized users. Data transferred from a site to the tools server may be via HTTPS. Call recording header data may contain no confidential data and therefore may not require encryption storage and access control. FIG. 16 shows the security associated with the storage of sensitive audio recordings. These security measures and others may ensure security for sensitive information that may be contained in recorded calls, such as, social security information, account information, medical information, and other sensitive personal and/or commercial information.

In the preceding specification, various preferred embodiments have been described with reference to the accompanying drawings. It may, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
receiving, via a voice portal, one or parameters specifying a call recording request;
receiving at least a portion of the call recording request at a voice response unit;
identifying a call received at the voice response unit as a call matching one or more parameters of the call recording request; and
utilizing available digital signal processing resources of the voice response unit to record one or more specified portions of the call.

2. The method of claim 1, wherein the one or more parameters specifying a call recording request include at least one of: a channel, a record start time, a record stop time, a number of calls to record, and a percentage of calls to record.

3. The method of claim 1, wherein the call is recorded on a Time Domain Multiplexing based network.

4. The method of claim 1, wherein the call is recorded on an IP based network.

5. The method of claim 1, wherein determining whether a call should be recorded is based at least in part on available resources of the voice response unit.

6. The method of claim 1, wherein the one or more parameters of a call request include at least one of: Automatic Number Identification (ANI) data, Dialed Number Identification Service (DNIS) data, a time interval, the identity of a user application, and a called party number.

7. The method of claim 1, further comprising storing metadata related to the one or more recorded portions of the call.

8. The method of claim 7, wherein the metadata comprises at least one of: an application id, a calling party number, a called party number, a recording name, an order number, a recording type, a recording start time, a recording stop time, and a user specified keyword.

9. The method of claim 1, further comprising encrypting the one or more recorded portions of the call.

10. The method of claim 1, further comprising enabling a user to manage a call recording.

11. The method of claim 10, wherein managing a call recording includes playing back a call recording.

12. The method of claim 11, wherein playing back a call recording includes at least one of the following: rendering the send channel of the recording, rendering the receive channel of the recording, rendering the send channel of the recording mixed with the receive channel of the recording, rendering the send channel of the recording mixed with the receive channel of the recording in stereo, and sending the raw PCAP (packet capture) file.

13. The method of claim 11, wherein playing back a call recording further comprises translating dual-tone multi-frequency (DTMF) data associated with the call into audible speech identifying the data.

14. The method of claim 11, wherein translating a dual-tone multi-frequency (DTMF) data utilizes captured packets compliant with request for comments (RFC) 2833.

15. The method of claim 10, wherein managing a call recording further comprises searching for a call recording utilizing metadata associated with the call recording.

16. The method of claim 10, wherein managing a call recording further comprises at least one of: saving a call recording, deleting a call recording, and setting one or more attributes associated with a call recording.

17. The method of claim 1, further comprising storing the recorded call on at least one of: an application server associated with the voice response unit, and a record server associated with the voice response unit.

18. The method of claim 1 further comprising at least one of: invoicing one or more charges associated with recording a call, reporting one or more actions associated with recording a call, enabling a user to manage one or more call related services via a voice portal, and providing one or more network services via a tools server.

19. A computer readable media comprising code to perform the acts of the method of claim 1.

20. A system, comprising:
a database configured to store recorded call data;
a web portal, wherein the web portal enables a user to enter one or more parameters specifying a call recording request; and
a network element communicatively coupled to a network wherein the network element is configured to:
receive at least a portion of a call recording request at a voice response unit;
identify a call received at the voice response unit as a call matching one or more parameters of the call recording request; and
utilize available digital signal processing resources of the voice response unit to record one or more specified portions of the call.

21. The method of claim 1, where determining whether a call should be recorded is based at least in part on a record order associated with the call.

22. A system comprising:
a web based portal providing a user interface for call recording functionality;
storage for storing recorded calls communicatively coupled to the web based portal;
a voice response unit communicatively coupled to a network wherein the voice response unit is configured to:
receive at least a portion of a call recording request from the web based portal;
identify a call received at the voice response unit as a call matching one or more parameters of the call recording request;
utilize available digital signal processing resources of the voice response unit to record one or more specified portions of the call;
convert the one or more specified portions of the call into packet based data; and
transfer recorded call packets to storage.

* * * * *